United States Patent [19]

Matsumoto et al.

[11] Patent Number: 5,535,012
[45] Date of Patent: Jul. 9, 1996

[54] INFORMATION TRANSMIT/RECEIVE APPARATUS ONTO WHICH A SORTER CAN BE MOUNTED VIA AN ADAPTER

[75] Inventors: Hiroaki Matsumoto, Yokohama; Ikuo Sobue; Seishi Ejiri, both of Kawasaki; Masao Kiguchi; Yasuhiro Matsumoto, both of Yokohama; Yoshiyuki Nakayama, Kawasaki, all of Japan

[73] Assignee: Canon Kabushiki Kaisha, Tokyo, Japan

[21] Appl. No.: 280,705

[22] Filed: Jul. 25, 1994

[30] Foreign Application Priority Data

| Jul. 31, 1993 | [JP] | Japan | 5-208745 |
| Jul. 31, 1993 | [JP] | Japan | 5-208746 |
| Jul. 31, 1993 | [JP] | Japan | 5-208747 |
| Jul. 31, 1993 | [JP] | Japan | 5-208748 |

[51] Int. Cl.⁶ .......... G03G 21/00; H04N 1/00; H04N 1/04; B65H 43/00
[52] U.S. Cl. .......... 358/400; 358/468; 358/496; 358/498; 355/321; 355/323; 271/287; 271/288; 271/292; 271/293; 271/176
[58] Field of Search .......... 358/400, 401, 358/468, 476, 496, 498, 296; 355/321, 323; 271/288, 292, 293, 176, 287

[56] References Cited

U.S. PATENT DOCUMENTS

| 4,176,941 | 12/1979 | Breitenkam et al. | 355/14 R |
| 4,618,245 | 10/1986 | Fukushi et al. | 355/14 SH |
| 4,854,572 | 8/1989 | Knight | 272/70 |
| 5,050,860 | 9/1991 | Matsuo et al. | 271/293 |
| 5,255,908 | 10/1993 | Hiroi et al. | 271/293 |

FOREIGN PATENT DOCUMENTS

| 56-120258 | 9/1981 | Japan . |
| 57-95755 | 6/1982 | Japan . |
| 57-163250 | 10/1982 | Japan . |
| 59-143833 | 8/1984 | Japan . |
| 61-23083 | 1/1986 | Japan . |
| 61-059961 | 3/1986 | Japan . |
| 63-313182 | 12/1988 | Japan . |
| 1-203168 | 8/1989 | Japan . |
| 2-157578 | 6/1990 | Japan . |
| 2-178169 | 7/1990 | Japan . |
| 3162364 | 7/1991 | Japan . |
| 4-44083 | 2/1992 | Japan . |
| 4-44075 | 2/1992 | Japan . |
| 4-44076 | 2/1992 | Japan . |
| 4-44077 | 2/1992 | Japan . |
| 4-44078 | 2/1992 | Japan . |
| 4-44079 | 2/1992 | Japan . |
| 4-44080 | 2/1992 | Japan . |
| 4-44081 | 2/1992 | Japan . |
| 4-44082 | 2/1992 | Japan . |
| 4-080182 | 3/1992 | Japan . |
| 4-204980 | 7/1992 | Japan . |
| 4-204981 | 7/1992 | Japan . |
| 4-204982 | 7/1992 | Japan . |
| 4-204983 | 7/1992 | Japan . |
| 4-204984 | 7/1992 | Japan . |
| 4-189259 | 7/1992 | Japan . |
| 4189259 | 7/1992 | Japan . |
| 5-107851 | 4/1993 | Japan . |
| 2152014 | 7/1985 | United Kingdom . |

*Primary Examiner*—Edward L. Coles, Sr.
*Assistant Examiner*—Kimberly A. Williams
*Attorney, Agent, or Firm*—Fitzpatrick, Cella, Harper & Scinto

[57] ABSTRACT

An information transmit/receive apparatus comprises a printer having a sheet feed portion and a sheet discharge portion, an original reader having a sheet feed portion and a sheet discharge portion and a sorter having a sheet entrance port which is connected to the sheet discharge portion of the printer via an adapter for coupling the sheet discharge portion and the sheet entrance port together. The adapter has a transparent portion through which the recording sheet passage in the adapter can be visually observed, whereby a jam of a recording sheet in the adapter portion can be easily observed. A control means performs receive and transmit operations.

9 Claims, 23 Drawing Sheets

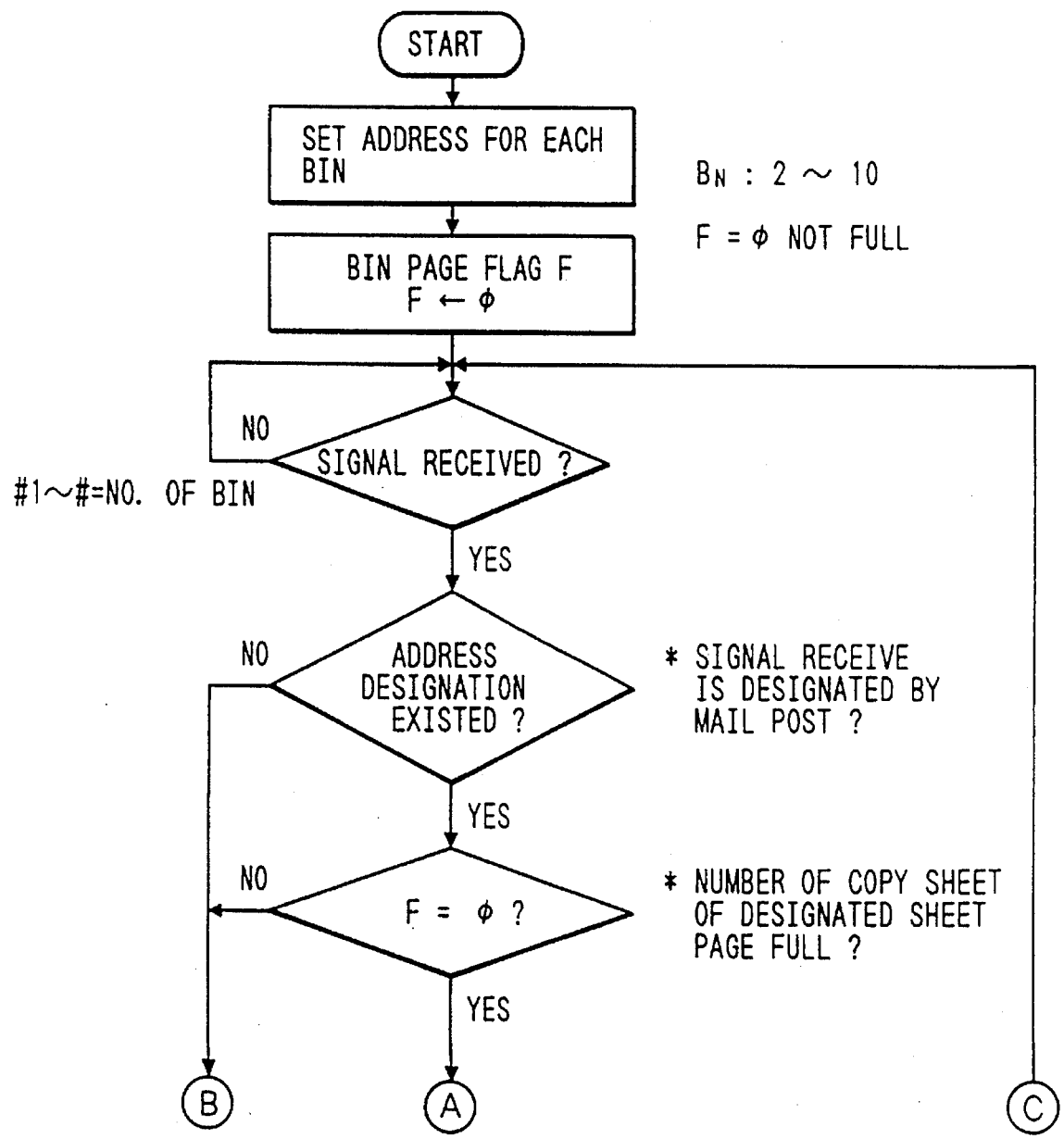

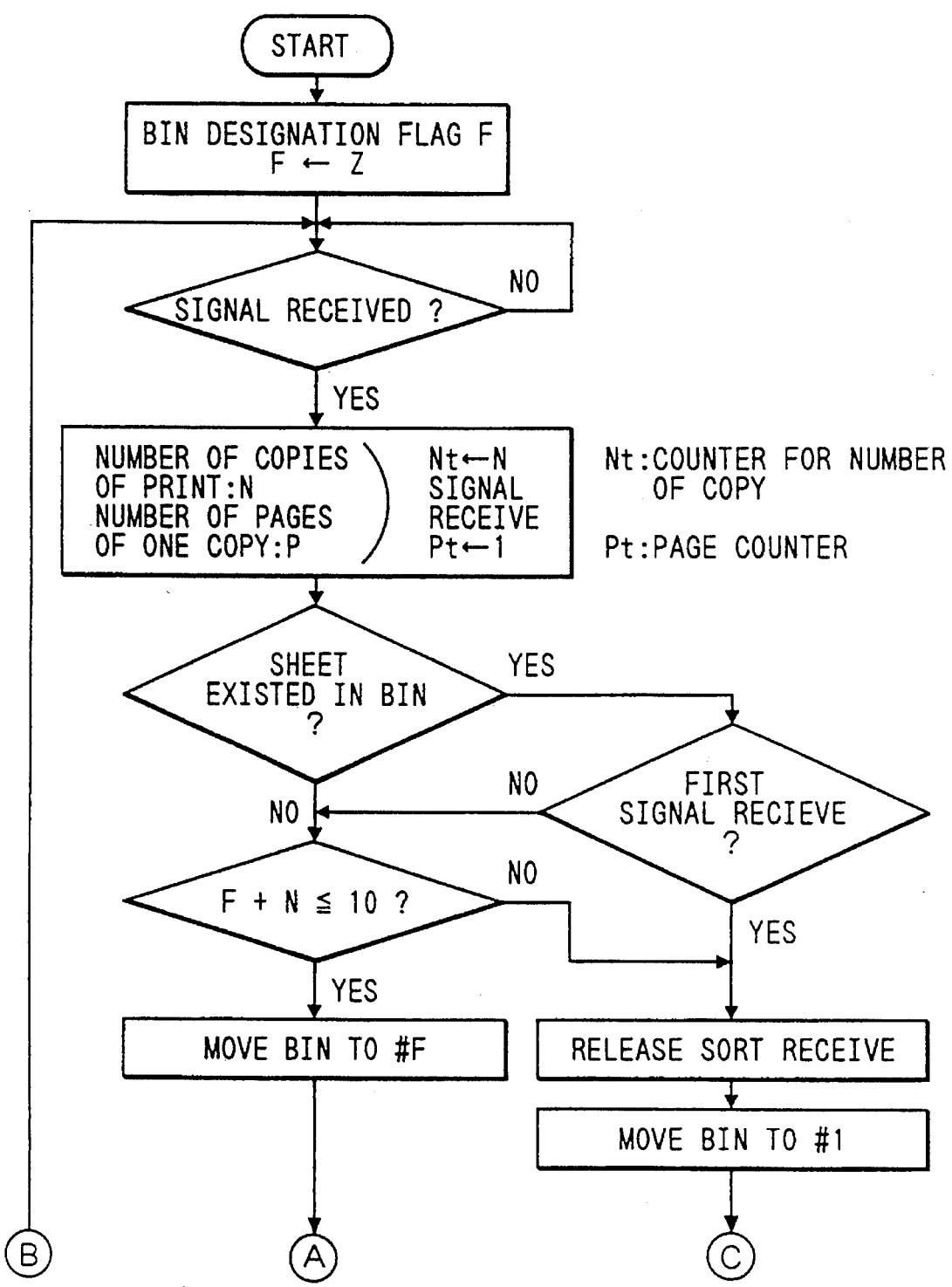

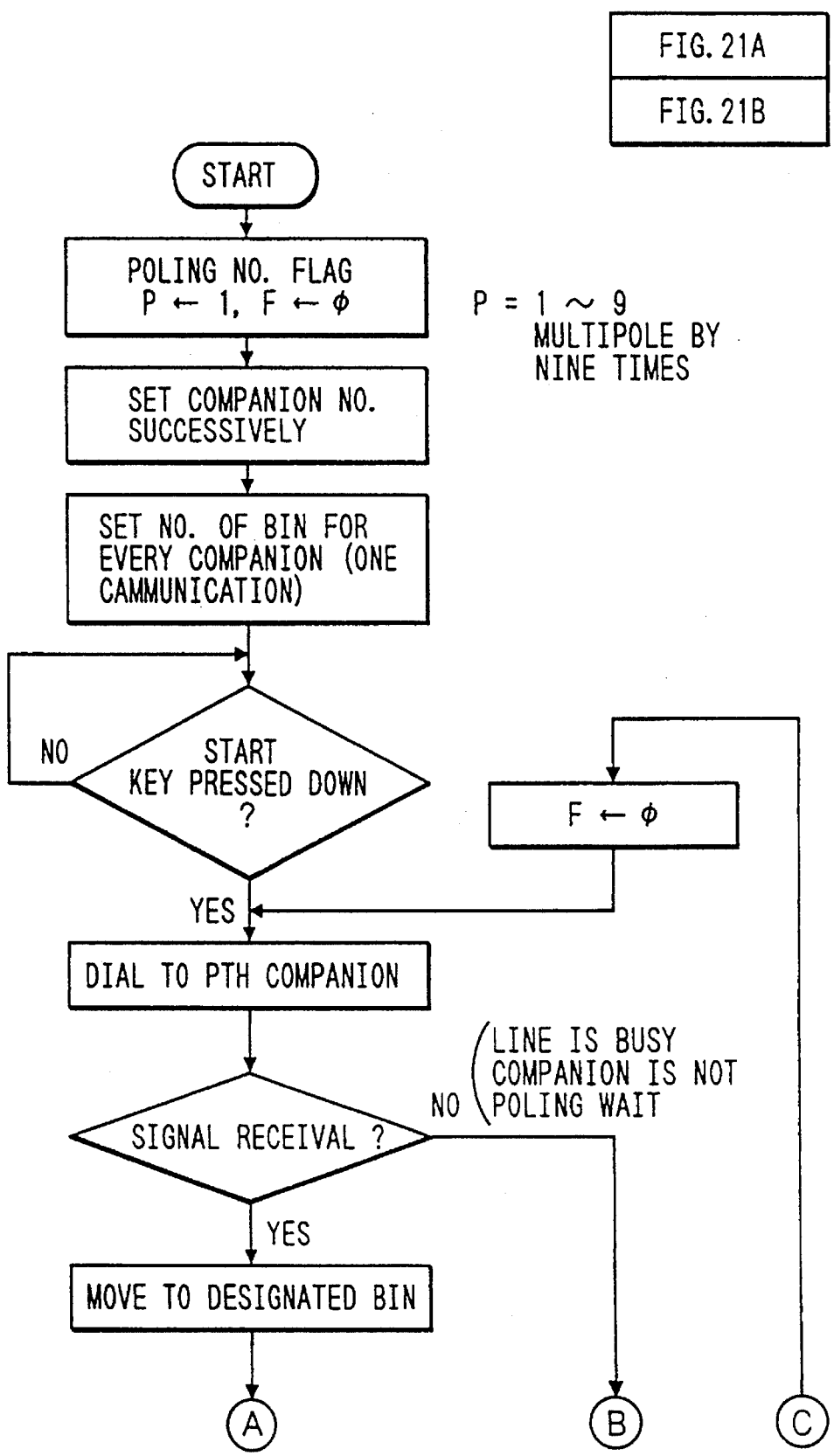

INFORMATION TRANSMIT/RECEIVE APPARATUS ONTO WHICH A SORTER CAN BE MOUNTED VIA AN ADAPTER

BACKGROUND OF THE INVENTION

1. Field of the Invention

The present invention relates to an information transmit/receive apparatus (facsimile apparatus) comprising a sorter (recording sheet sorting device).

2. Related Background Art

A facsimile apparatus or image forming apparatus comprising a sorter is known in, e.g., Japanese Patent Laid-Open Nos. 57-95755, 56-120258, 1-203168 (U.S. Pat. No. 5,050,860, filed on Sep. 24, 1991 and 61-23083 (U.S. Pat. No. 4,854,572, filed on Aug. 8, 1989).

A conventional sorter has poor versatility, and cannot be attached to various types of facsimile apparatuses. For this reason, the type of sorter which can be attached is limited, or conversely, a facsimile apparatus to which the sorter can be attached is limited.

SUMMARY OF THE INVENTION

It is an object of the present invention to improve the versatility of an apparatus of this type.

It is another object of the present invention to improve the operability of an apparatus of this type.

According to the present invention, there is provided an information transmit/receive apparatus comprising a printer having a sheet feed portion and a sheet discharge portion, an original reader having a sheet feed portion and a sheet discharge portion, a sorter having a sheet insertion port, and connected to the sheet discharge portion of the printer via an adapter for coupling the sheet discharge portion and the sheet insertion port, and control means for performing receive and transmit operations.

As described above, according to the present invention, in the information transmit/receive apparatus comprising a sorter, since the information transmit/receive apparatus is connected to the sorter via the adapter, they can be connected independently of the type of apparatus, and the versatility can be improved. When the adapter is provided with a cover having a transparent portion through which the recording sheet passage state in the adapter can be visually observed, a jam of a recording sheet in the adapter portion can be easily visually observed, and jam processing is facilitated.

The maximum allowable number of sheets on a single bin tray in a sort mode is set to be larger than that in a group mode. Furthermore, the apparatus further comprises means for, when the number of pages of recording images is larger than the maximum allowable number of sheets in the group mode, moving a bin tray to a position of the neighboring bin tray before recording sheets are discharged up to the maximum allowable number of sheets in the group mode, and thereafter, discharging remaining recording sheets after the bin tray is returned to an original bin position.

The allowable contain number of sheets on a bin tray of the sorter is set to be a predetermined number of sheets. However, when sheets more than the predetermined number of sheets are to be discharged, a bin is moved once to cause the discharged sheets to settle, and thereafter, remaining sheets are discharged. Thus, sheets more than the predetermined number of sheets can be discharged onto and contained in the bin. Therefore, the number of sheets to be carried on the bin can be increased, and the capacity of the bin can be maximally utilized. More specifically, the apparatus comprises control means for selecting one of a sort mode for operating bin vertical moving means to move the bin upward or downward every time a sheet enters a single bin, and a group mode for continuously discharging sheets on a single bin, and the maximum allowable number of sheets on the single bin in the sort mode is set to be larger than that in the group mode.

Also, the apparatus comprises means for, when the number of pages of recording images is larger than the maximum allowable number of sheets in the group mode, moving a bin tray to a position of the neighboring bin tray before recording sheets are discharged up to the maximum allowable number of sheets in the group mode, and thereafter, discharging remaining recording sheets after the bin tray is returned to an original bin position. Upon vertical movement of the bin, sheets in the bin are shaken to settle, and the number of discharged sheets to be carried on the bin can be increased.

The sorter comprises:

a plurality of bin trays;

a supply port for supplying a sheet to the bin trays;

bin moving means for vertically moving the bin trays; and control means for maintaining a standby state wherein the uppermost one of the bin trays faces the supply port, and for, when sheets are sorted, moving the bin trays upward in turn after the second bin tray from the top of the bin trays is caused to face the supply port.

The contain number of sheets of the uppermost bin tray is largest. The sorter further comprises control means for moving the bin trays downward to a position where the uppermost bin tray faces the supply port after sheets are sorted, and thereafter, setting the standby state.

Since the sorter comprises the control means for maintaining the state wherein the uppermost bin tray faces the sheet supply port, and for, when sheets are sorted, moving the bin trays upward in turn after the second bin tray below the uppermost bin tray is caused to face the sheet supply port, and the other control means for moving the bin trays downward to the position where the uppermost bin tray faces the sheet supply port after sheets are sorted, and thereafter, setting the standby state, the uppermost bin tray which has a high use frequency and a larger capacity of sheets stands by at the home position, and sheets are discharged on this bin tray last, thus facilitating sorter control and improving operability.

DESCRIPTION OF THE PREFERRED EMBODIMENTS

The illustrated embodiment of the present invention will be described hereinafter. This embodiment will exemplify a facsimile apparatus comprising a sorter.

Figure 1:
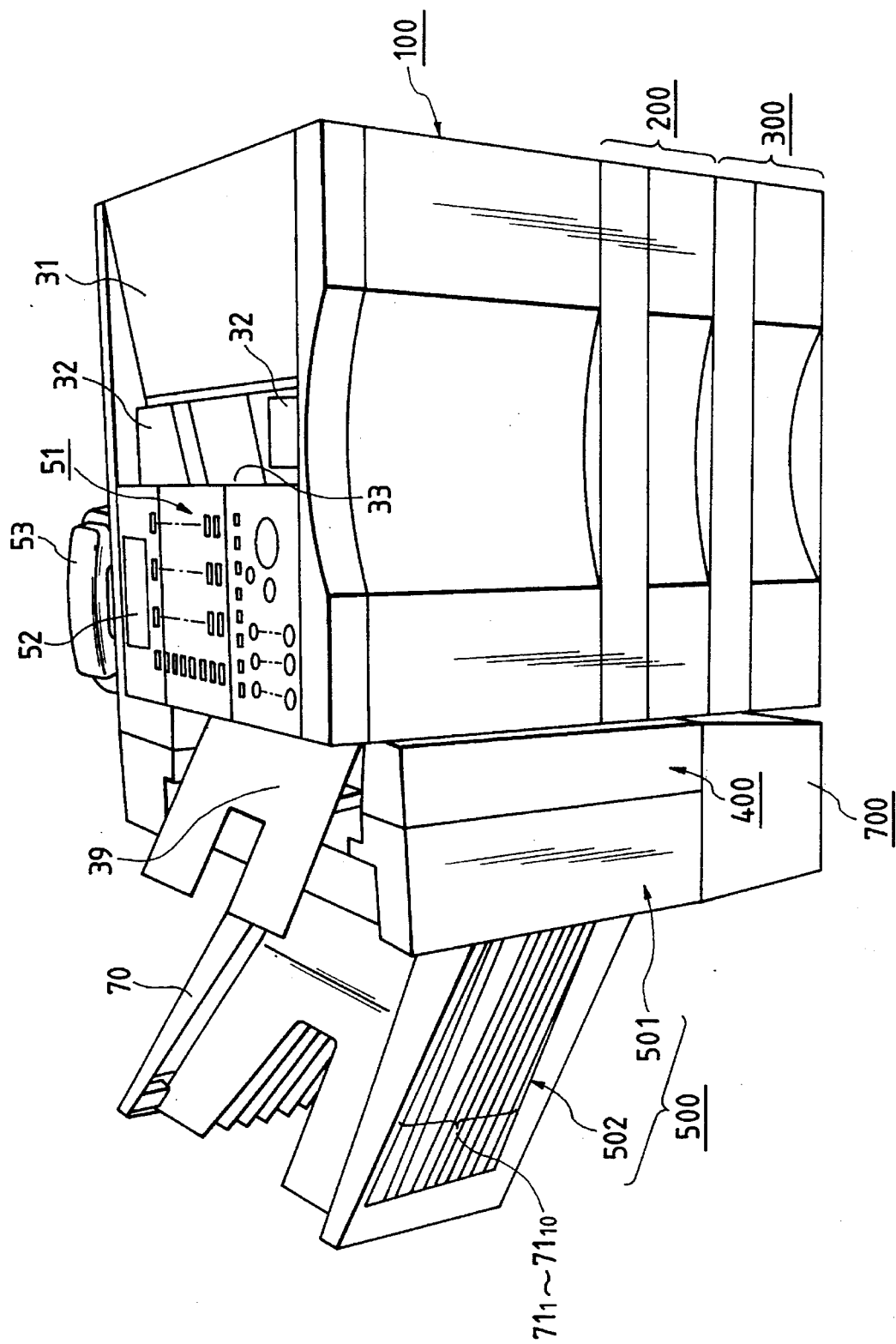
FIG. 1 is a perspective view showing the outer appearance, viewed from the front side, of a facsimile apparatus comprising a sorter.
Figure 2:
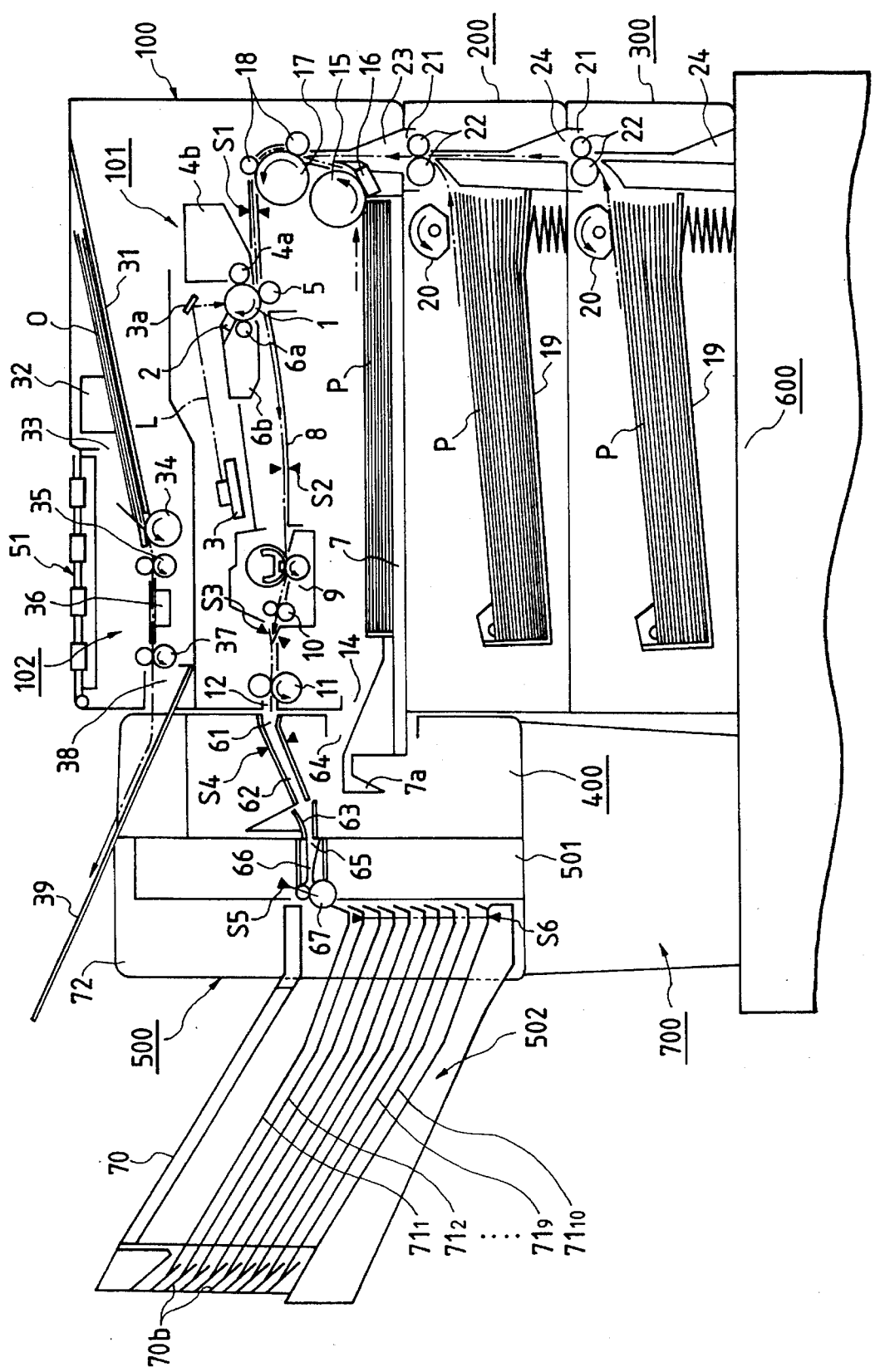
FIG. 2 is a longitudinal sectional front view showing the internal schematic arrangement.

FIG. 1 is a perspective view showing the outer appearance, viewed from the front side, of the facsimile apparatus comprising the sorter, and FIG. 2 is a longitudinal sectional front view showing the internal arrangement of the apparatus.

A facsimile main body 100 is combined with optional first and second sheet feed unit devices 200 and 300. A sorter 500 is connected to the facsimile main body 100 via an adapter 400. These devices 100 to 500 are placed on a pedestal 600 (FIG. 2). A base 700 is inserted between the lower surfaces of the adapter 400 and the sorter 500, and the upper surface of the pedestal 600.

The first and second sheet feed unit devices 200 and 300 are optional devices which are used to be properly combined with the facsimile main body 100. The first and second sheet feed unit devices 200 and 300 are combined with the facsimile main body 100, such that the sheet feed unit devices are vertically stacked and the facsimile main body 100 is placed thereon.

The sorter 500 is combined with the facsimile main body 100, i.e., is connected to the sheet (recording sheet or copy) discharge side of the facsimile main body 100 via the adapter 400. Controllers of the facsimile main body 100, the first and second sheet feed unit devices 200 and 300, and the sorter 500 are electrically connected to each other via electrical adapters, and are controlled in association with each other by exchanging information with each other. The pedestal 600 is a base for all the devices 100, 200, 300, and 400. The base 700 is a member for filling the space between the lower surfaces of the adapter 400 and the sorter 500, and the upper surface of the pedestal 600.

A. Facsimile Main Body 100

The facsimile main body 100 mainly comprises a printer unit 101 (FIG. 2), an original reader unit 102, and the controller.

(a) Printer unit 101

The printer unit 101 comprises a laser printer mechanism utilizing a transfer type electrophotography process in the apparatus of this embodiment. More specifically, a drum-shaped electrophotography photosensitive body (to be referred to as a photosensitive drum hereinafter) 1 as an image carrier is rotated clockwise (the direction of an arrow in FIG. 2) at a predetermined peripheral velocity (process speed). The outer circumferential surface of the rotating photosensitive drum 1 is uniformly primary-charged by a charger 2 to have a predetermined polarity and potential. When the charged surface is subjected to raster scanning exposure with a laser beam L which is output from a laser scanner 3 and is modulated in correspondence with time-serial electrical digital pixel signals of target image information, an electrostatic latent image corresponding to the target image information is formed on the surface of the rotating photosensitive drum 1. A mirror 3a deflects the laser beam L output from the laser scanner 3 toward the surface of the photosensitive drum 1.

The latent image formed on the surface of the photosensitive drum 1 is developed by a developer 4a to obtain a toner image. The developer 4a has a toner tank 4b. The toner image is sequentially transferred onto a recording sheet (transfer sheet) P which is fed, to a transfer portion between the photosensitive drum 1 and a transfer device 5, from an internal sheet feed cassette 7 (sheet feed unit) of the printer main body 100, or from the first or second sheet feed device 200 or 300.

The sheet P on which the toner image is transferred by the transfer portion is separated from the surface of the photosensitive drum 1 and is fed into an image fixing device 9 via a convey unit 8. The toner image is fixed on the sheet P by the image fixing device 9. The sheet P on which the image is fixed by the fixing device 9 is fed from the facsimile main body 100 into the sorter 500 via the adapter 400 along a path including a pair of fixing discharge rollers 10 (convey rotary members)→a pair of discharge rollers 11 (discharge rotary members)→a discharge port 12 (a discharge unit).

Figure 3:
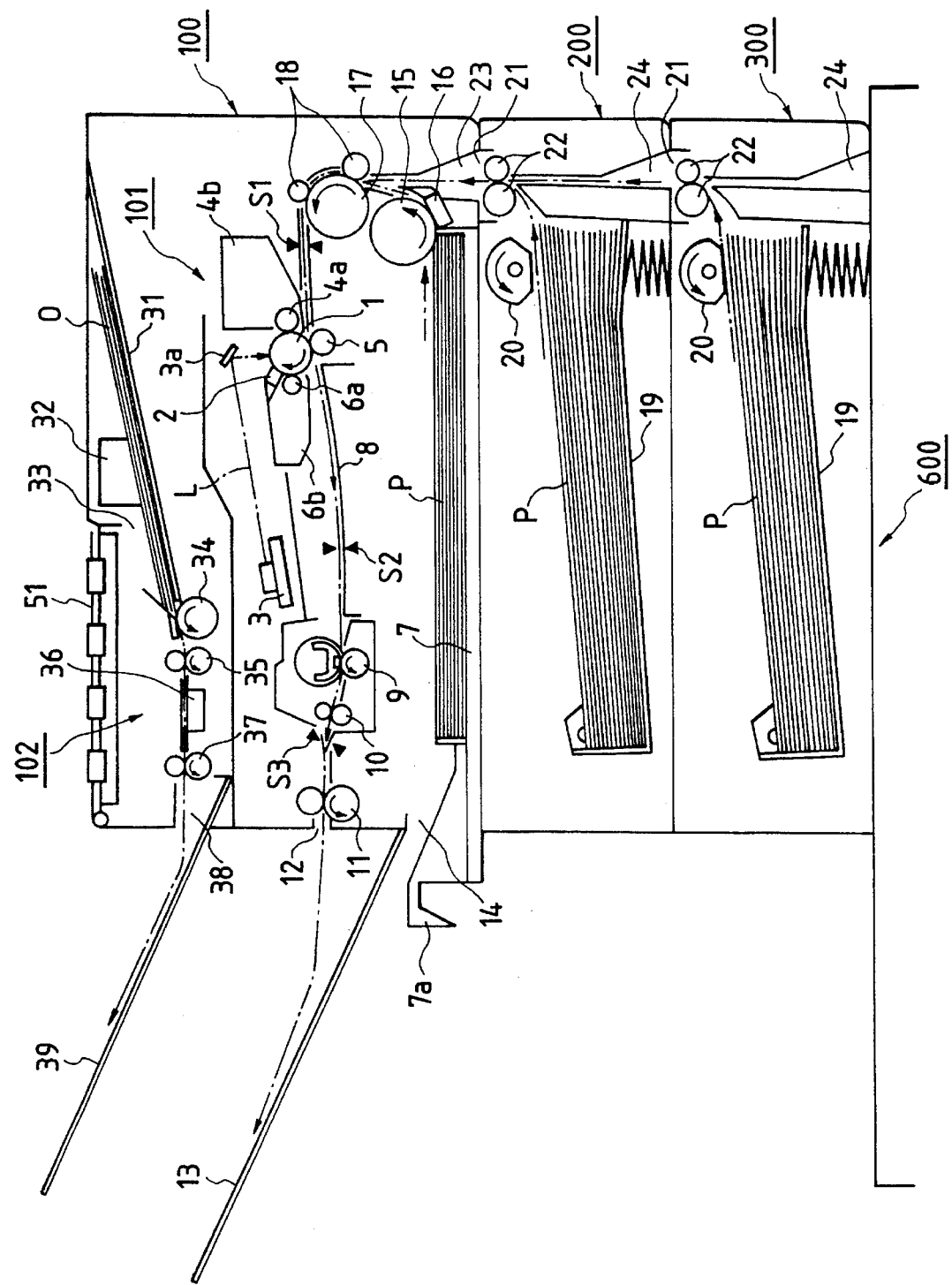
FIG. 3 is a longitudinal sectional front view of a facsimile apparatus which does not use any sorter.

When the sorter 500 is not combined with the facsimile main body 100, a detachable discharge tray 13 is attached to the discharge port 12 of the facsimile main body 100, as shown in FIG. 3, and a sheet is discharged into this discharge tray 13. After the toner image is transferred onto the recording sheet P, the surface of the photosensitive drum 1 is cleaned by removing a residue such as a transfer residual toner by a cleaning device 6a, and is repetitively used in operations. The removed residual toner is stored in a waste toner tank 6b.

In the facsimile main body 100 of this embodiment, four image forming process devices, i.e., the photosensitive drum 1, the charger 2, the developer 4a, and the cleaning device 6a of the printer unit 101 constitute a process cartridge which is detachable from a predetermined portion in the facsimile main body 100.

The image fixing device 9 adopts a film heating type image heating fixing device in this embodiment. In a fixing device of this type, a sheet as a medium to be heated which carries a non-fixed toner image is brought into tight contact with the surface of a heating member via a heat-resistant film, and is conveyed together with the heat-resistant film to apply heat of the heating member to the sheet via the heat-resistant film, thereby thermally fixing the toner image. This device is disclosed in, e.g., Japanese Patent Laid-Open Nos. 63-313182, 2-157878, 4-44075 to 4-44083, 4-204980 to 4-204984, and the like.

Since such a film heating type fixing device can use a heating member and film which have a small heat capacity, as compared to, e.g., a heat roller type fixing device, low power consumption and short wait time (quick starting) can be achieved. Since the apparatus can be quickly started, a pre-heating process in a non-fixing operation can be omitted. For this reason, various advantages such as energy saving in a total sense, suppression of temperature rise in the apparatus, and the like can be expected.

Figure 4:
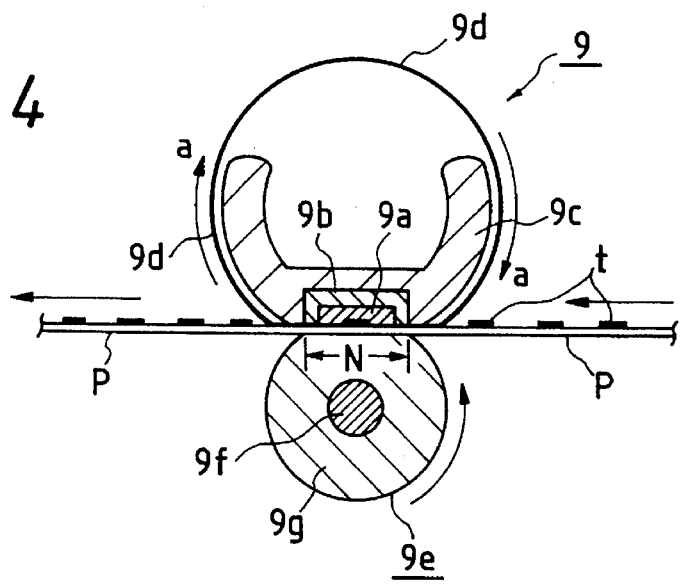
FIG. 4 is a schematic view of a film heating type image heating/fixing device used in the present invention.

FIG. 4 shows the schematic arrangement of the film heating type image heating fixing device 9 of tensionless type, which uses a cylindrical film as the heat-resistant film, and rotates the film by a compression roller.

This device comprises a heating portion which is basically constituted by a heating member 9a, a film inner surface guide member 9c which holds the heating member 9a on its lower surface via a heat insulation member 9b, and a cylindrical (endless belt-like) heat-resistant film (fixing film) 9d loosely fitted on the film inner surface guide member 9c including the heating member 9a, and a compression roller 9e as a compression portion, which is urged against the heating member 9a to sandwich the film 9d therebetween.

The heating member 9a comprises a low-profile ceramic heater which has a small heat capacity, and is elongated in a direction perpendicular to a rotational direction $\underline{a}$ of the cylindrical fixing film 9d or the convey direction of the sheet P as a medium to be heated.

The film inner surface guide member 9c is a laterally elongated member which is elongated in a direction perpendicular to the rotational direction $\underline{a}$ of the cylindrical fixing film 9d or the convey direction of the sheet P, consists of a heat-resistant resin or the like, and has a substantially arcuated barrel-like cross-section. The two end portions of the member 9c are fixed and supported between side plates of a device frame. The heating member 9a is fitted, via the heat insulation member 9b, in a groove formed in the central portion of the lower surface of the film inner surface guide member 9c along the longitudinal direction of the member 9c, and is adhered thereto by a heat-resistant adhesive. When the film inner surface guide member 9c itself consists of a heat-resistant heat insulation material, the heat insulation member 9b may be omitted.

Energization electrodes (not shown) at the two end portions of the ceramic heater 9a as the heating member are energized by an AC energization circuit (not shown), and the temperature of the effective length region of the heater rises. The temperature of the heater is detected by a temperature sensor (not shown) such as a thermistor, and the detected temperature information is fed back to a controller (not shown). Then, the energization to the heater 9a is controlled, so that the temperature output detected by the temperature sensor is equal to a predetermined constant value. More specifically, the energization to the heater 9a is controlled, so that the temperature of the heater 9a is maintained to be a predetermined fixing temperature.

The fixing film 9d is a 50-μm thick heat-resistant film member which is constituted by forming a mold release layer such as PFA on the outer surface of a polyimide film as a base.

The compression roller 9e is constituted by a core metal 9f and a heat-resistant elastic layer 9g consisting of, e.g., silicone rubber. The compression roller 9e is pressed against the ceramic heater 9a as the heating member via the fixing film 9d by a predetermined pressing force of a compression spring (not shown), thereby forming a contact nip portion (fixing nip portion) N having a predetermined width.

The compression roller 9e is rotated counterclockwise (the direction of an arrow in FIG. 4) by a drive system (not shown), and a rotational force acts on the cylindrical fixing film 9d by the frictional force between the outer surfaces of the rotating compression roller 9e and the fixing film 9d. As a result, the fixing film 9a is rotated in the clockwise direction $\underline{a}$ (in the direction of the arrow in FIG. 4) around the film inner surface guide member 9c while the inner surface of the fixing film 9d is brought into tight contact with and slides along the surface of the heater 9a in the fixing nip portion N.

The film inner surface guide member 9c makes the rotation of the fixing film 9d easy, and also regulates movements, in the circumferential direction and the longitudinal direction, of the rotating fixing film 9d, thereby preventing unwanted fluttering or skew of the film.

In the state wherein the fixing film 9d is being rotated upon rotation of the compression roller 9e, and the temperature of the ceramic heater 9a as the heating member is controlled to the predetermined fixing temperature, the sheet P as a medium to be heated on which a non-fixed toner image t is formed and carried is conveyed from the image forming mechanism side, and is fed into the device. The sheet P enters a portion between the film d and the compression roller 9e in the fixing nip portion N formed between the heater 9a and the compression roller 9e to sandwich the film 9d therebetween, and is brought into tight contact with the outer surface of the rotating fixing film 9d. The sheet P is then clamped and conveyed in the fixing nip portion together with the film 9d. As a result, heat of the heater 9a is applied to the sheet P via the film 9d, and the non-fixed toner image t on the sheet P is thermally fixed onto the surface of the sheet P. The sheet P which leaves the fixing nip portion N is separated from the surface of the film 9d, and is conveyed to be discharged.

The sheet feed cassette 7 incorporated in the facsimile main body 100 is located below the printer unit 101, and is detachable from the facsimile main body 100 from a mounting port 14 formed in the lower portion of the side wall, on the sheet discharge side, of the facsimile main body 100. The cassette 7 has a grip 7a.

When a sheet is fed from the sheet feed cassette 7, a sheet feed roller 15 is rotated to pick up the uppermost one of a stack of sheets P contained in the cassette 7 in cooperation with a separation member 16. The picked-up sheet is fed in a direction opposite to the sheet discharge side of the facsimile main body, and is guided upward by a sheet guide. Then, the sheet is conveyed along a U-turn path by means of a turn roller 17 and contact rollers 18.

A sheet sensor S1 is arranged at the middle portion of the sheet path between the turn roller 17 and the transfer unit 5. When the sheet sensor S1 detects the leading end of the sheet P which is conveyed along the U-turn path from the turn roller 17 toward the transfer unit, the sheet convey operation is temporarily stopped, and is synchronized with the progress of image formation on the photosensitive drum 1. The sheet convey operation is restarted at a timing when the leading end of a toner image portion formed on the surface of the photosensitive drum 1 coincides with the leading end of the sheet P, and the sheet P is fed to the transfer unit. A sheet sensor S2 is arranged at the middle portion of the sheet path of the convey unit 8, and a sheet sensor S3 is arranged at the sheet exit side of the pair of fixing discharge rollers 10.

(b) Original Reader Unit 102

An original table (sheet feed unit) 31 is arranged on the upper surface of the facsimile main body 100 so as to be inclined downward to the left, and movable side guides 32 regulate the two sides of an original O placed on the original table.

A stack of originals O are set on the original table 31, in such a manner that the leading end portions of the originals O with the image surfaces facing down are inserted from an original insertion port 33 into the facsimile main body until they abut against a stopper (not shown), and the two sides of the stack of originals O are regulated by moving the movable side guides 32.

A single-original separation/feed means 34 operates on the basis of an original reading start signal, and the lowermost one of the stack of originals O set on the original table is separated and guided into the facsimile main body. The separated original is conveyed at a predetermined speed along a path including a pair of first convey rollers 35→a pair of second convey rollers 37→a discharge port 38, and is discharged onto a discharge tray 39 (sheet discharge unit). While the original O is conveyed between the first and second convey rollers 35 and 37, the image surface, facing down, of the original O is sequentially read by a photoelectric image reading element array 36 arranged between the rollers 35 and 37 as time-serial electrical digital pixel signals.

In a facsimile signal transmit mode, the read image information is transmitted to a distant facsimile apparatus.

In a copy mode, the above-mentioned printer unit 101 operates, and the laser scanner 3 outputs the laser beam L which is modulated in correspondence with the time-serial electrical digital pixel signals as the original reading image information. Then, the printer unit 101 executes image formation as a copy operation.

In a signal receive mode, transmit information from a distant (transmit source) facsimile is received while being stored in a memory in a control system. The printer unit 101 operates, and received information stored in the memory is read out. Thereafter, the laser scanner 3 outputs the laser beam L which is modulated in correspondence with the time-serial electrical digital pixel signals as the received information, and the printer unit 101 executes image formation as a signal receive recording operation.

As is apparent from FIG. 2, the original reader unit 102 is arranged above the printer unit 101, and their sheet discharge units are directed in the same direction.

(c) Controller

The circuit board of the controller of the facsimile main body 100 is arranged at a proper position in the facsimile main body. An operation panel 51 is arranged on the upper surface side of the facsimile main body, and the single-original separation/feed means 34, the first convey rollers 35, the photoelectric image reading element array 36, the second convey rollers 37, and the like are located below the operation panel 51. A telephone set 53 is arranged on the upper surface of the facsimile main body, as shown in FIG. 1.

Figure 5A:
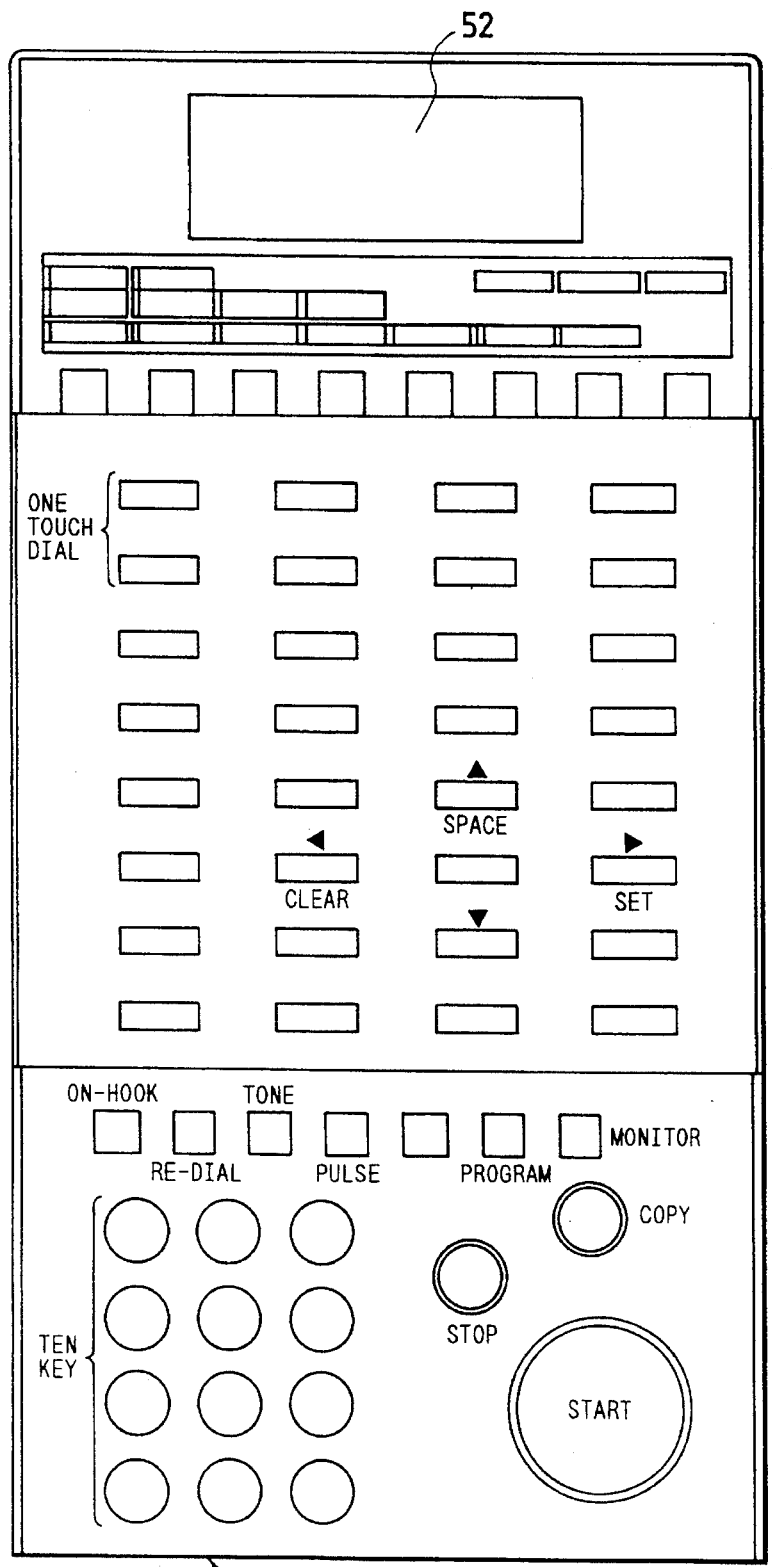
FIGS. 5A and 5B are respectively an enlarged plan view and a side view of an operation panel.
Figure 5B:
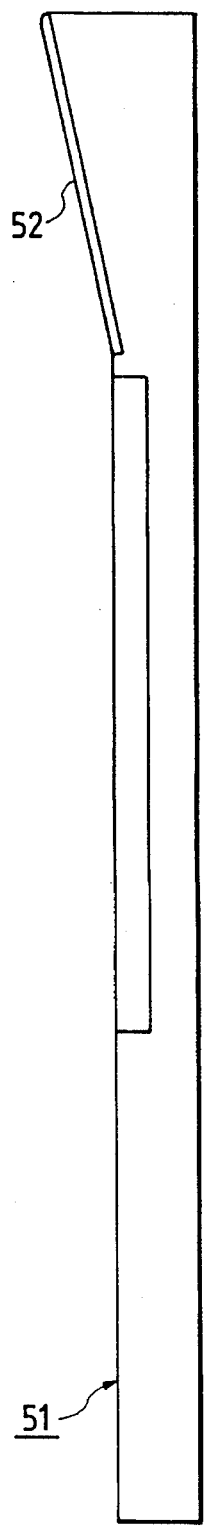

FIGS. 5A and 5B are respectively an enlarged plan view and a side view of the operation panel 51. On the operation panel 51, a liquid crystal display 52 (LCD) for displaying various messages, various kinds of operation keys (buttons), function keys, and the like are arranged. With the operation panel 51, a user can designate, set, and input required information and control modes in the controller.

B. First and Second Sheet Feed Unit Devices 200 and 300

① The first and second sheet feed unit devices 200 and 300 are of vertical stacking/floor mount type, and a stack of two sheet feed unit devices are used in this embodiment. The facsimile main body 100 is set on the stack of the sheet feed unit devices. The sheet feed unit devices 200 and 300 of this embodiment have the same structure, and are of so-called front loading type. That is, a sheet feed cassette 19 can be pulled out to the front side of the apparatus, and sheets P can be re-filled.

② When a sheet is fed from the upper, first sheet feed unit device 200, a sheet feed roller 20 in the device 200 is rotated to pick up the uppermost one of a stack of sheets P contained in the sheet feed cassette 19 in cooperation with a separation member (not shown). The picked-up sheet is fed in a direction opposite to the sheet discharge side of the facsimile main body 100, and is guided upward by a sheet guide. The sheet is supplied by a pair of discharge rollers 22 arranged at a discharge port 21 open to the top plate of the device 200 into a sheet reception port 23 open to the bottom surface of the facsimile main body 100 and opposing the discharge port 21, and is conveyed upward in the facsimile main body 100. The sheet is then conveyed to the transfer unit along the U-turn path by the turn roller 17 and the contact rollers 18.

③ When a sheet is fed from the lower, second sheet feed unit device 300, a sheet feed roller 20 in the device 300 is rotated to pick up the uppermost one of a stack of sheets P contained in a sheet feed cassette 19 in cooperation with a separation member (not shown), to feed it in a direction opposite to the sheet discharge side of the facsimile main body 100. The sheet is guided upward by a sheet guide, and is supplied by a pair of discharge rollers 22 arranged at a discharge port 21 open to the top plate of the device 300 into a sheet reception port 24 open to the bottom surface of the upper first sheet feed unit device 200 and opposing the discharge port 21. The sheet is then conveyed upward in the first sheet feed device unit 200. Thereafter, the sheet is conveyed to the transfer unit along the U-turn path including the discharge rollers 22 of the first sheet feed unit device 200→sheet reception port 23 of the facsimile main body the 100→turn roller 17 and the contact rollers 18.

C. Adapter 400

The sorter 500 is connected to the sheet discharge side of the facsimile main body 100 via the adapter 400.

The adapter 400 has, on its surface facing the facsimile main body, a sheet entrance port 61 for receiving a sheet discharged from the facsimile main body 100, and an opening portion 64 for receiving the grip 7a of the internal sheet feed cassette 7 of the facsimile main body so as to avoid interference with the grip, and has a sheet exit port 63 on its surface facing the sorter. The adapter 400 includes a sheet path 62 for communicating the sheet entrance port 61 with the sheet exit port 63. A sheet sensor $4 (sheet passage sensor BPS) detects if a sheet is discharged from the facsimile main body 100 into the sheet path 62 in the adapter 400.

After the discharge tray 13 (FIG. 3) is detached from the facsimile main body 100, the adapter 400 is held to the sheet discharge side of the facsimile main body 100 in a state wherein the sheet entrance port 61 faces and matches the sheet discharge port of the facsimile main body 100 and the opening portion 64 receives the grip 7a externally projecting from the sheet feed cassette 7. Thereafter, the adapter 400 is mechanically firmly connected to the sheet discharge side of the facsimile main body 100 by hooking means such as a hook mechanism or locking means such as screw fixing means (neither are shown).

The adapter 400 has an upper recess portion so as not to interfere with the original discharge tray 39 of the facsimile main body 100. When the facsimile main body 100 (printer unit) and the sorter 500 are connected to each other via the adapter 400, they can be connected independently of the type of apparatus, and versatility can be improved. In this embodiment, the adapter 400 is formed by a transparent material or is provided with a cover having a transparent portion, so that occurrence of a sheet jam in the internal sheet path 62 can be easily visually observed.

D. Sorter 500

The sorter 500 comprises a drive unit 501 and a bin tray unit 502 vertically moved by the drive unit 501.

The drive unit 501 has, on its surface facing the adapter 400, a sheet entrance port 65 for receiving a sheet discharged from the sheet exit port 63 of the adapter 400, and has a pair of discharge rollers 67 (sheet supply port) behind its surface facing the bin tray unit 502. A sheet received by the entrance port 65 is guided to the discharge rollers 67 via a sheet path 66. A sheet sensor $5 (sorter entrance sensor) is arranged at the position of the discharge rollers 67. The drive unit 501 also incorporates a bin tray unit vertical drive mechanism, a controller, and the like (to be described later).

The sorter 500 is connected to the facsimile main body 100 via the adapter 400 in such a manner that the drive unit 501 is firmly connected to the adapter 400 by locking means (not shown) in a state wherein the sheet entrance port 65 of the unit 501 faces and matches the sheet exit port 63 of the adapter 400. In the bin tray unit 502, a large number of steps of (a total of 10 steps in this embodiment) bin trays (to be simply referred to as "bins" hereinafter) $71_1$ to $71_{10}$ are vertically arranged in a substantially parallelepiped frame 70, as shown in FIG. 6.

In this embodiment, the uppermost bin $71_1$ is defined as the first bin, and the bins below the bin $71_1$ are defined in turn as the second, third, . . . , 10th bins.

Figure 6:
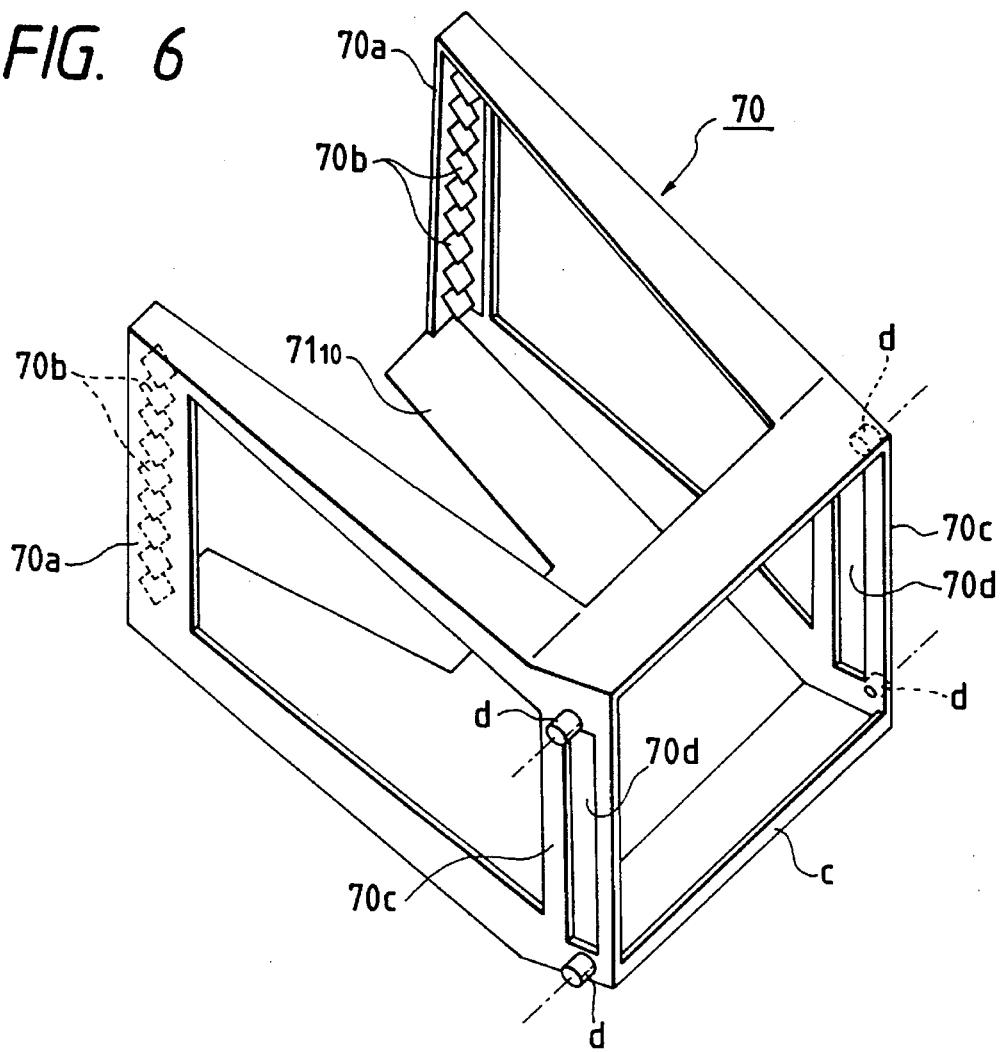
FIG. 6 is a perspective view of a bin tray housing frame of a bin unit.

In this embodiment, the lowermost 10th bin $71_{10}$ is fixed to the bin tray unit frame 70, as shown in FIG. 6. As shown in the plan view of FIG. 8, each of the other first to ninth bins $71_1$ to $71_9$ has tongue portions a which respectively project externally from the front and rear ends of the leading edge (the edge on the downstream side in the sheet discharge direction) of the bin, and has rollers (followers) b which are respectively axially supported on and externally project from the front and rear ends of the trailing edge (the edge on the upstream side in the sheet discharge direction) of the bin. An upward bent flange c is formed on the trailing edge of the bin.

The first to ninth bins $71_1$ to $71_9$ are vertically arranged in the frame 70 as follows. That is, the tongue portions a at the front and rear ends of the leading edges of the bins $71_1$ to $71_9$ are received and supported in turn by corresponding receive plates 70b which are arranged on the inner surfaces of front and rear vertical frame plates 70a on the leading end side of the pin tray unit frame 70 to be vertically separated by predetermined intervals. In addition, the rollers b at the front and rear ends of the trailing edges of the bins are fitted in vertical slit holes 70d which are formed in front and rear vertical frame plates 70c on the trailing end side of the bin tray unit frame 70, so that the distal ends of the rollers project outside the vertical frame plates 70c, as shown in FIG. 8.

Figure 9:
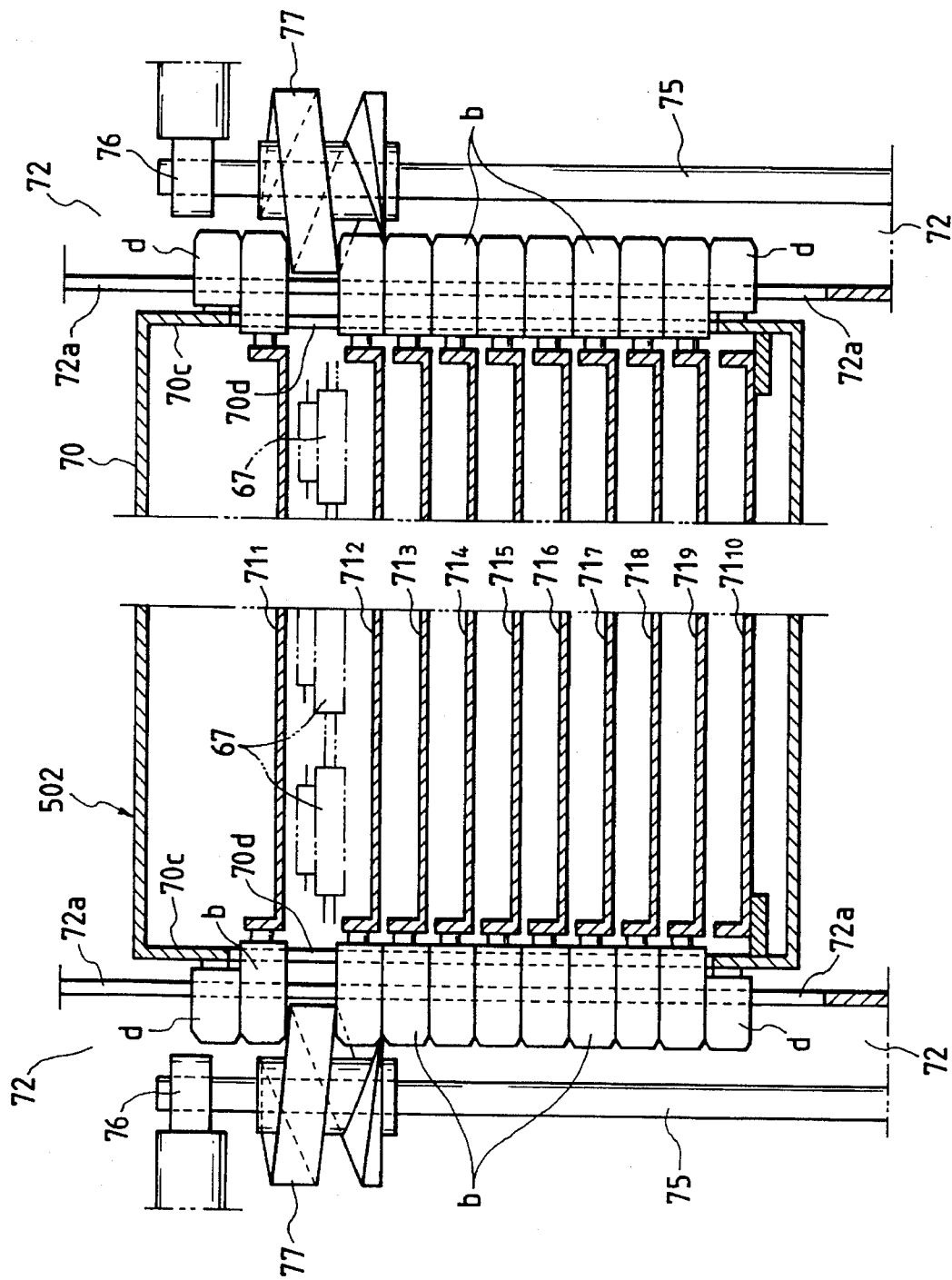
FIG. 9 is a longitudinal sectional front view of a bin tray unit.

In addition, rollers (followers) d are axially supported on the upper and lower end portions of the vertical slit holes 70d on the outer surfaces of the vertical frames 70c, as shown in FIGS. 6 and 9. The width of the slit hole 70d is larger than the outer diameters of the rollers b and d.

Figure 7:
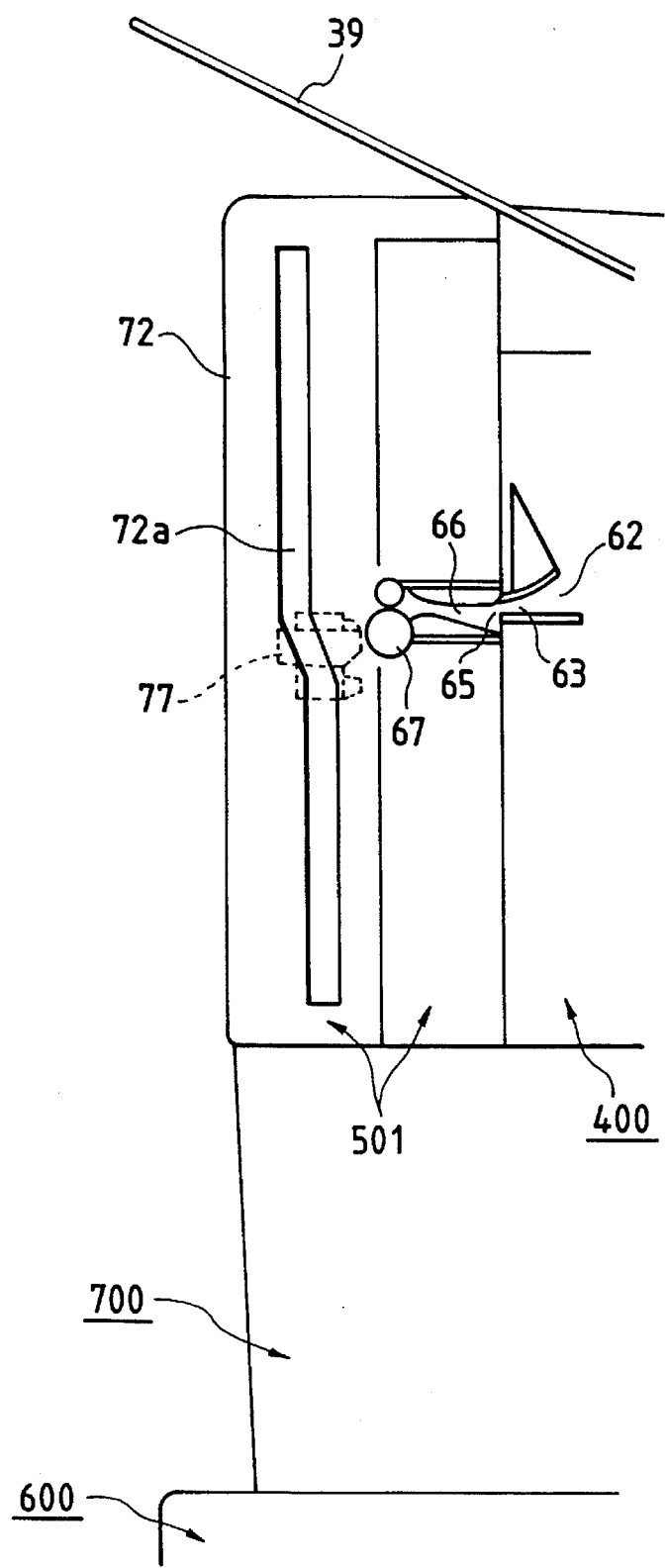
FIG. 7 is a longitudinal sectional side view of a sorter drive unit.

The opposing inner wall surfaces of front and rear hollow vertical frame portions 72 of the sorter drive unit 501 respectively have vertical slit holes 72a in a mirror-surface symmetrical state, as shown in FIG. 7. The width of the slit hole 72a is substantially the same as the outer diameters of the rollers b and d. As shown in FIG. 7, the slit hole 72a consists of a vertical slit hole portion vertically extending from the lower end to a position near the discharge rollers 67, a bent slit hole portion which is contiguous with the vertical slit hole portion and is bent in a direction to be separated from the discharge rollers 67 at the horizontal position of the discharge rollers 67, and a vertical slit hole portion which is contiguous with the bent slit hole portion and vertically extends upward therefrom.

Figure 8:
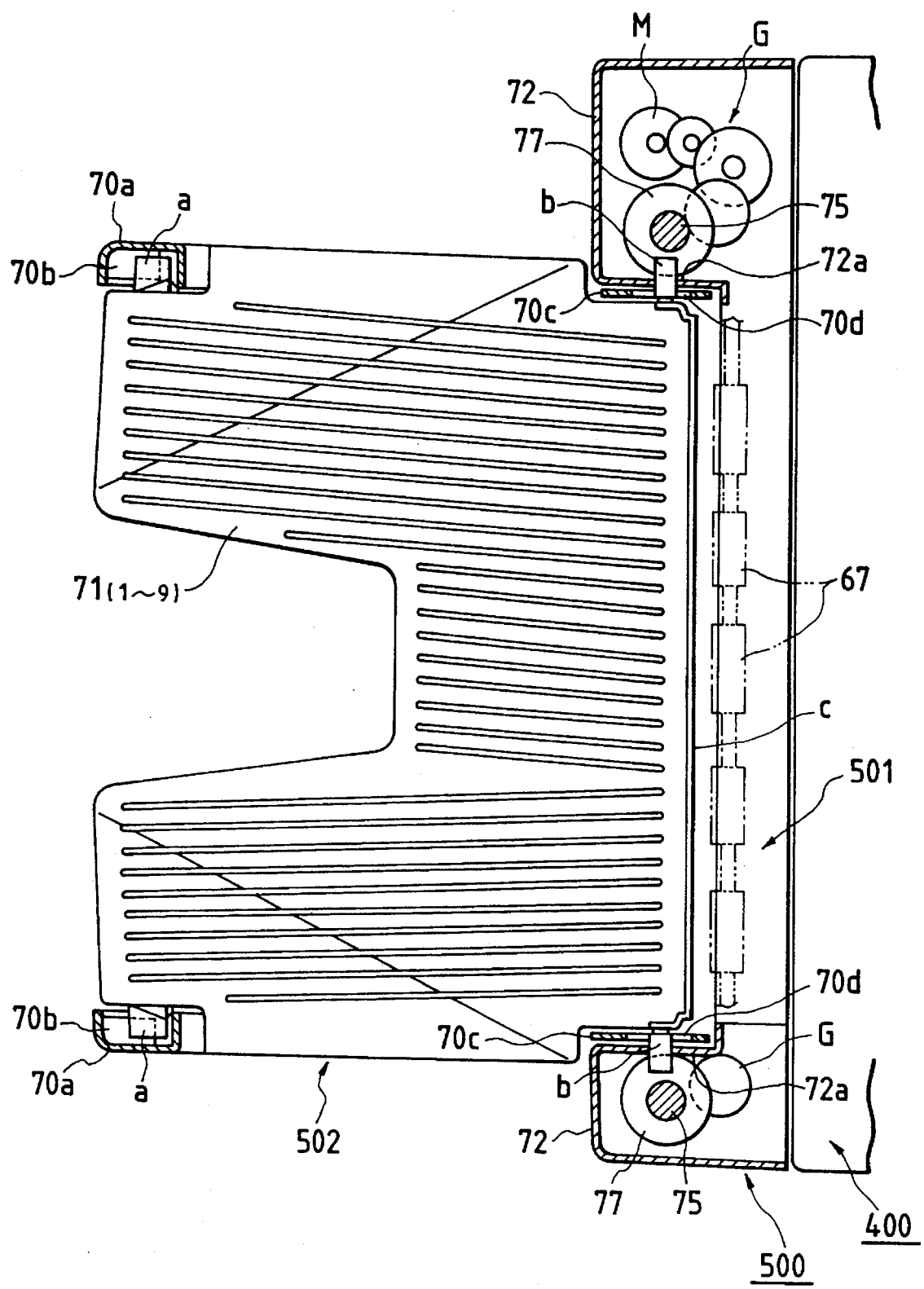
FIG. 8 is a cross-sectional plan view of the sorter.

The trailing end of the bin tray unit 502 in which the bins $71_1$ to $71_{10}$ are vertically arranged in the frame 70 is set in correspondence with a portion between the front and rear vertical frame portions 72 of the drive unit 501, and the rollers b and d projecting externally from the front and rear vertical frame plates 70c of the bin tray unit 502 are fitted in the vertical slit holes 72a formed in the inner wall surfaces of the vertical frame portions 72, as shown in FIGS. 8 and 9. In this manner, the bin tray unit 502 is mounted between the front and rear vertical frame portions 72 of the drive unit 501.

The bin tray unit 502 is vertically moved by a vertical moving mechanism arranged in the drive unit 501. More specifically, lead cam shafts 75 are vertically arranged in the front and rear hollow vertical frame portions 72 of the drive unit 501, while their upper and lower end portions are held by bearings, as shown in FIGS. 8 and 9. FIG. 9 illustrates bearings 76 at the upper end side. Lead cams (spiral cams) 77, which mesh with the front and rear rollers b and d of the bin tray unit 502, are fixed and supported on the upper end portions of the lead cam shafts 75. As shown in FIGS. 7 and 9, the lead cams 77 are located at substantially the same level as that of the discharge rollers 67 of the drive unit 501.

Referring to FIG. 8, a forward/reverse rotation motor (shift motor) M is arranged on the bottom portion of the rear hollow vertical frame portion 72 of the drive unit 501. The forward/reverse rotational force of the motor M is transmitted to the front and rear lead cam shafts 75 via a power transmission system G including a gear train, a sprocket, a chain, and the like (not shown), and the lead cam shafts 75, i.e., the lead cams 77 are rotated in the forward or reverse direction. The forward rotational direction of the lead cams 77 corresponds to a direction to feed, in turn, the rollers b of the respective bins upward, and the reverse rotational direction of the lead cams 77 corresponds to a direction to feed, in turn, the rollers b downward.

When the lead cams 77 are rotated in the forward direction, the rollers b of each bin are shifted upward from the lower to upper groove portions of the lead cams 77 while being guided along the vertical slit holes 72a upon every rotation of the lead cams 77, and the shifted rollers b abut against the lower portions of the upper rollers d arranged on the bin tray unit frame 70, or abut against the lower portions of the rollers b of the bin which has already been shifted. As a result, a push-up force acts on the upper rollers d, and the frame 70, i.e., the entire bin tray unit 502 is moved upward in turn by one roller, i.e., by one step of the bin against its weight.

Contrary to this, when the lead cams 77 are rotated in the reverse direction, the rollers of each bin are shifted downward from the upper to lower groove portions of the lead cams 77 while being guided along the vertical slit holes 72a upon every rotation of the lead cams 77, and the number of rollers present between the upper rollers d of the frame 70 and the lead cams 77 decreases one by one. As a result, the frame 70, i.e., the entire bin tray unit 502 is moved downward in turn by a distance corresponding to one roller, i.e., by one step of the bin by its weight.

As described above, the lead cams 77 are located at substantially the same level as that of the discharge rollers 67, and the trailing edge of the bin having the rollers b located immediately below the lead cams 77 is located at a position corresponding to the discharge rollers 67. In this state, since the bin immediately above the above-mentioned bin is pushed up by the lead height of the lead cams 77, the interval between the trailing edges of the bin located at the position corresponding to the discharge rollers 67 and the bin immediately thereabove is widened and becomes larger than that between the bins of other steps, as shown in FIG. 9. For this reason, a sheet can be smoothly discharged by the discharge rollers 67 onto the bin located at the position corresponding to the discharge rollers 67.

Figure 12:
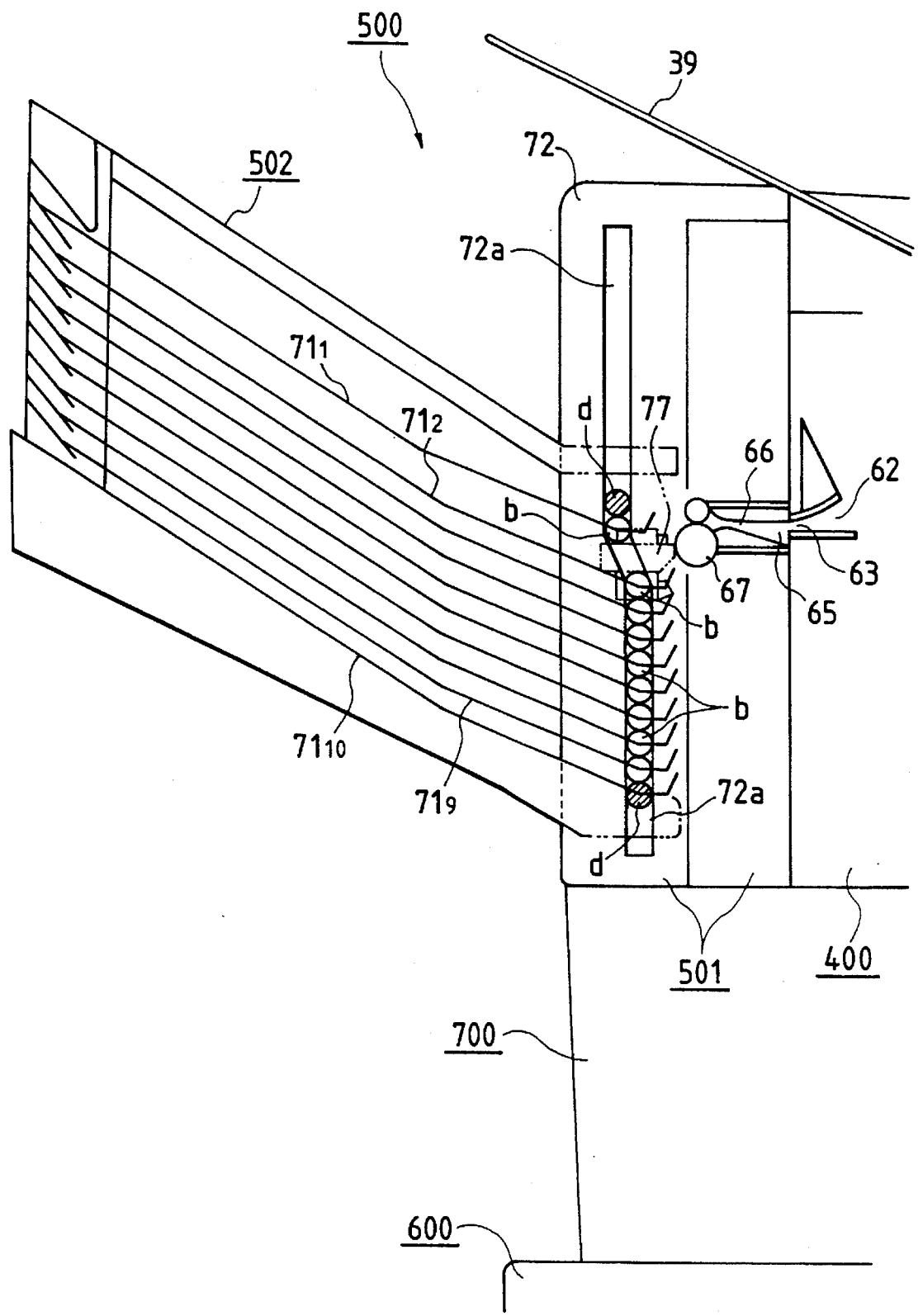
FIG. 12 is a view showing a state wherein the second bin tray from the top is set at a position facing the pair of discharge rollers.
Figure 13:
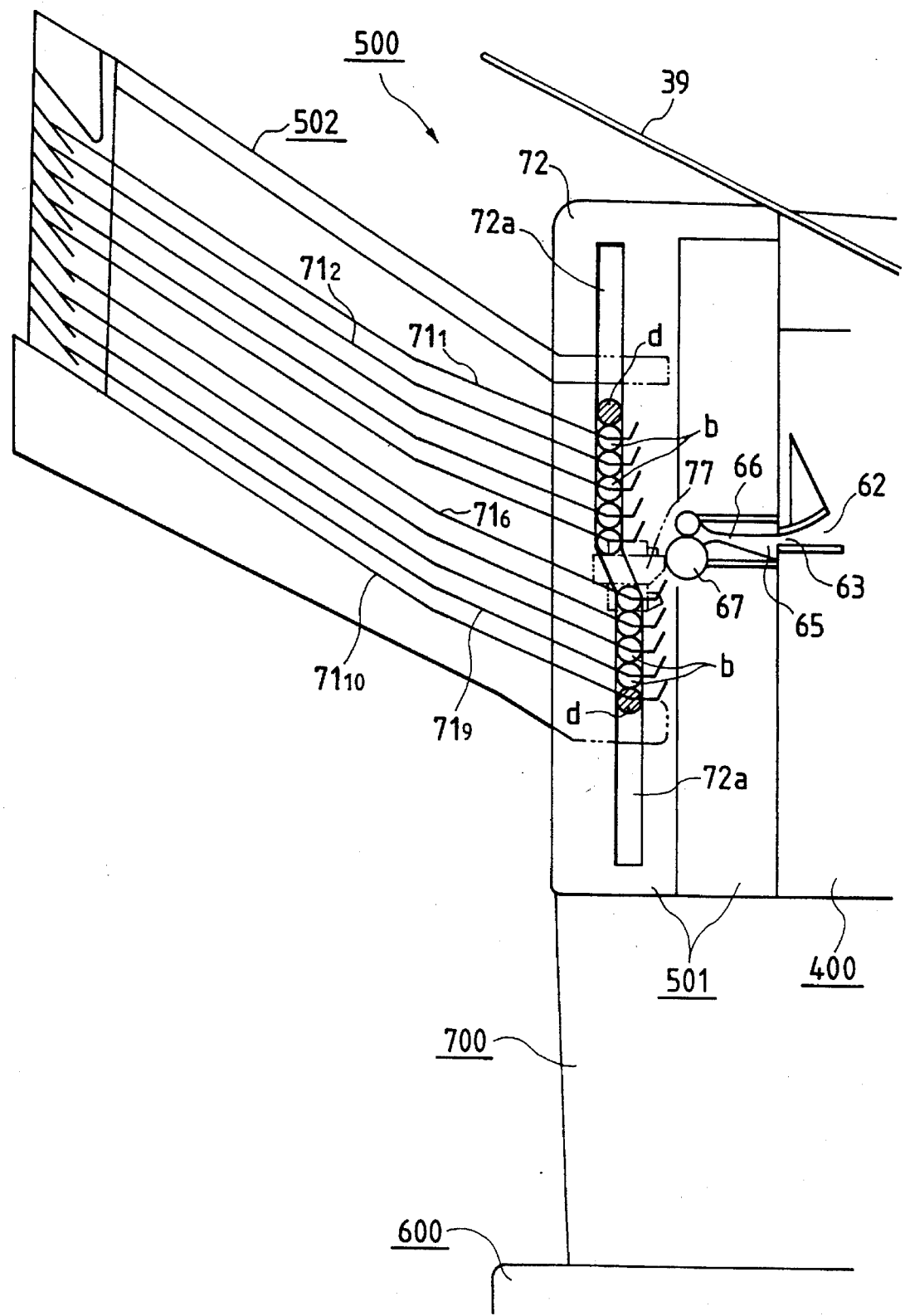
FIG. 13 is a view showing a state wherein the sixth bin tray from the top is set at a position facing the pair of discharge rollers.
Figure 14:
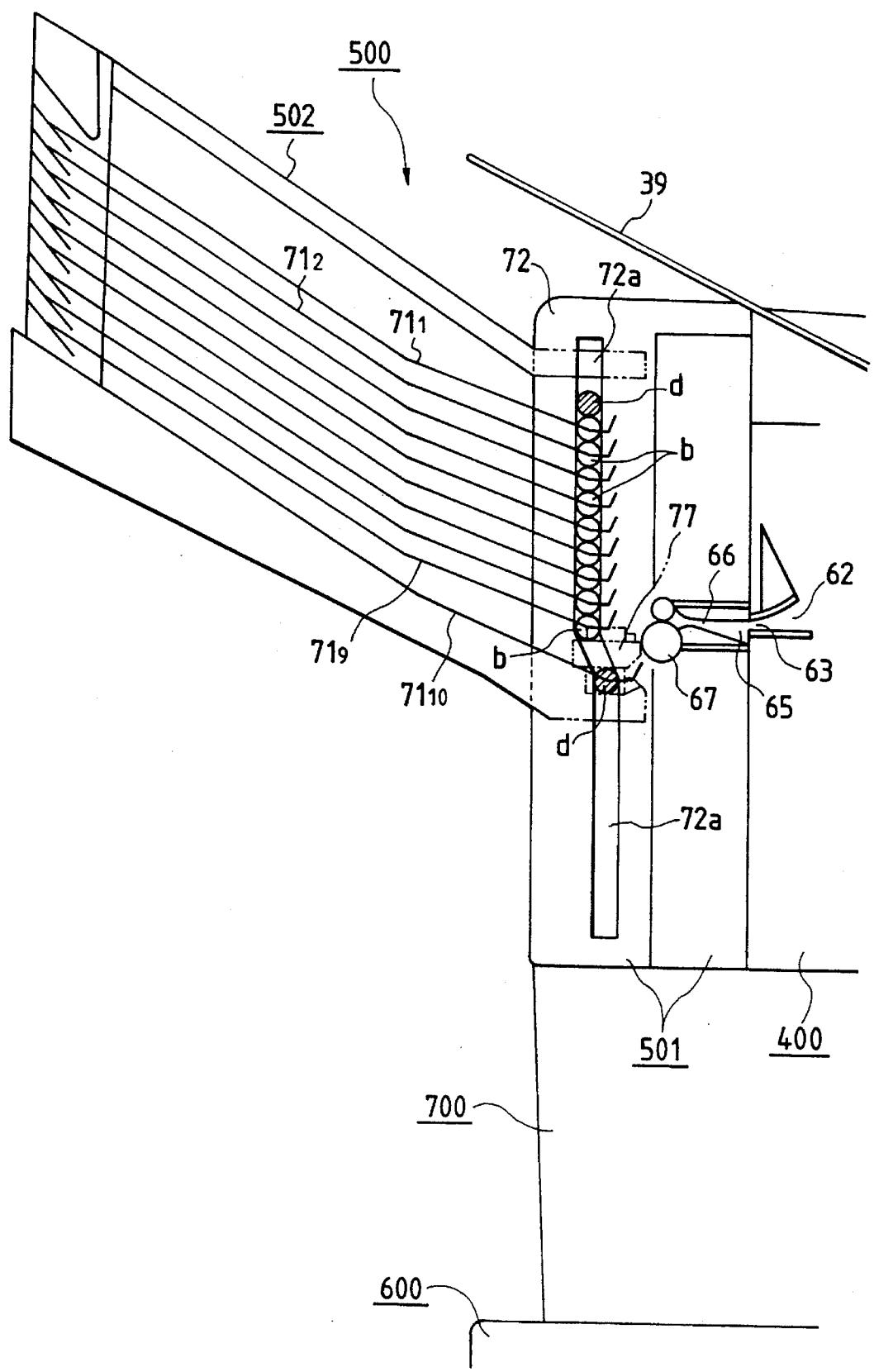
FIG. 14 is a view showing a state wherein the lowermost bin tray is set at a position facing the pair of discharge rollers.

In this embodiment, each of the vertical slit holes 72a for guiding the rollers b of the bins consists of a vertical slit hole portion vertically extending from the lower end to a position near the discharge rollers 67, a bent slit hole portion which is contiguous with the vertical slit hole portion and is bent in a direction to be separated from the discharge rollers 67 at the horizontal position of the discharge rollers 67, and a vertical slit hole portion which is contiguous with the bent slit hole portion and vertically extends upward therefrom, as described above (FIG. 7). For this reason, since the bin shifted above the level of the lead cams 77 is moved in a direction to be separated farther from the discharge rollers 67 than the bins below the lead cams 77, the trailing edge portion of the bin above the bin located at the position corresponding to the discharge rollers 67 is offset forward. With this mechanism as well, the opening at the trailing edge side of the bin located at the position corresponding to the discharge rollers 67 is widened, and a sheet can be smoothly discharged by the discharger rollers 67 onto this bin (FIGS. 12 to 14).

In this embodiment, the uppermost first bin (uppermost bin) $71_1$ is set to have a capacity capable of containing 100 sheets, and the second to 10th bins (intermediate bins) $71_2$ to $71_{10}$ are set to have a capacity capable of containing 20 sheets.

Figure 10:
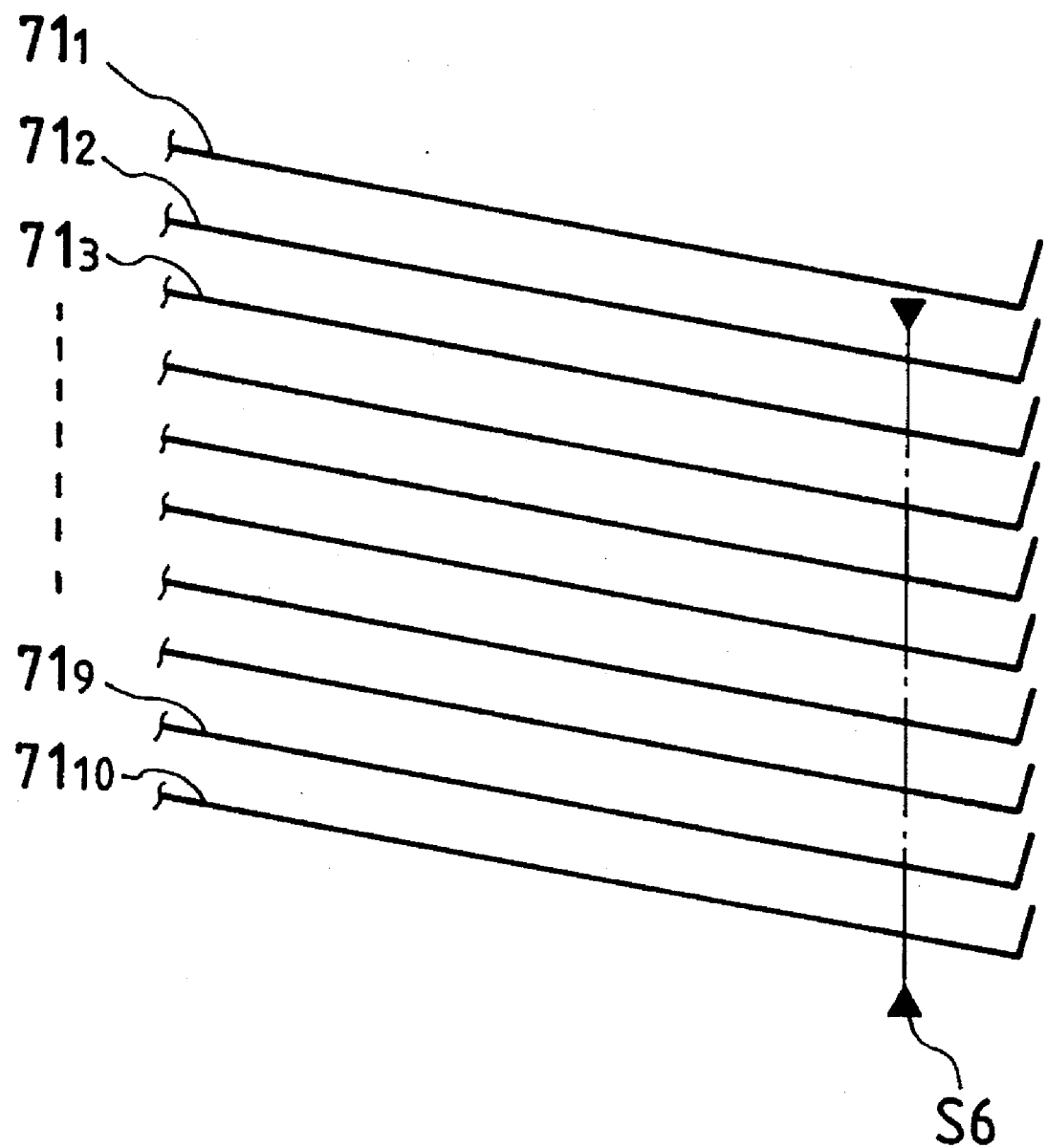
FIG. 10 is a view showing a through sensor portion of the bin trays.

Referring to FIGS. 2 and 10, a sheet sensor S6 (through sensor) is used common to the second to 10th bins $71_2$ to $71_{10}$ except for the uppermost first bin $71_1$, and when sheets are present on at least one bin other than the first bin $71_1$, the sensor optical path is shielded by the sheets, and the sensor S6 detects the "presence" of sheets.

Figure 11:
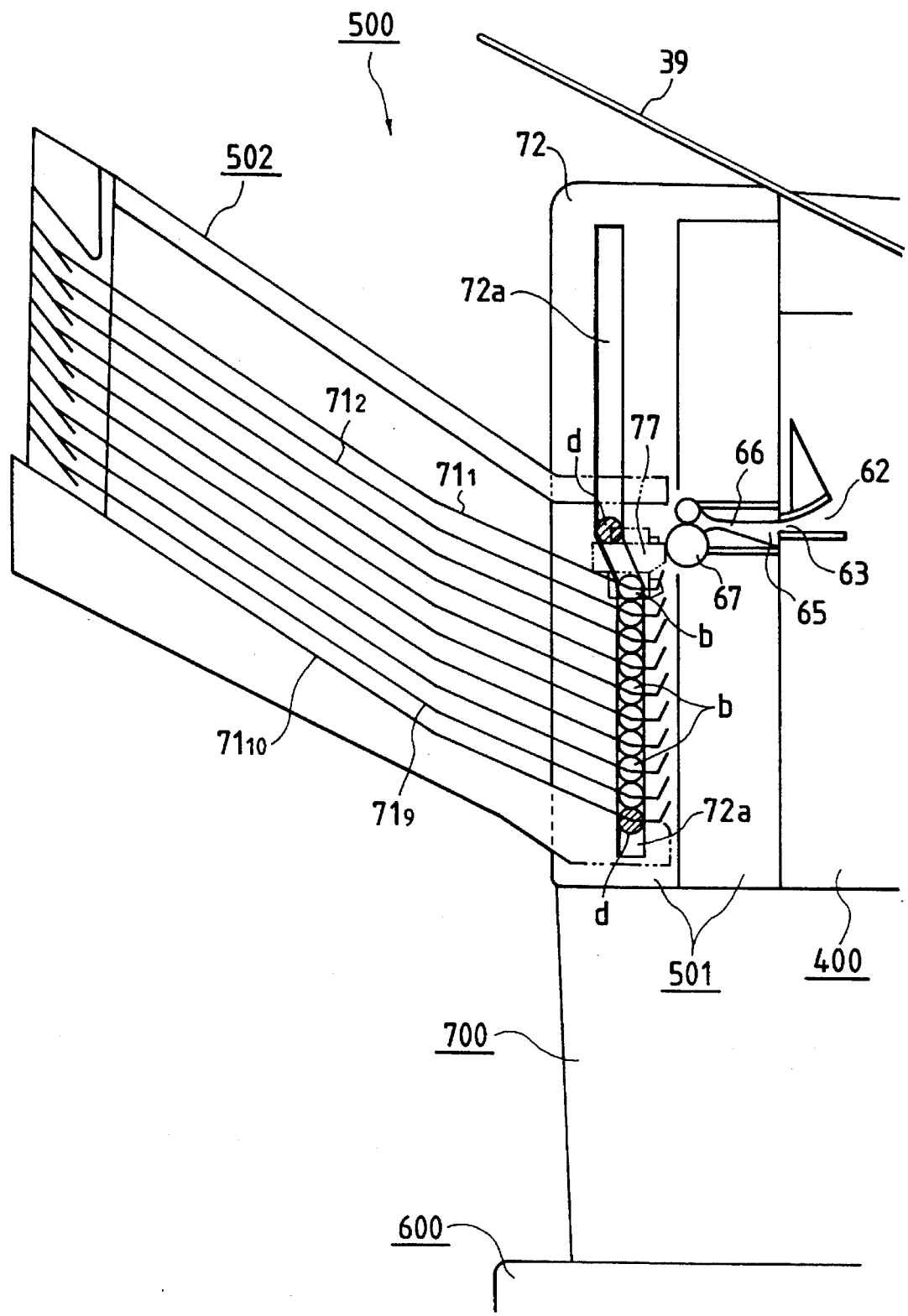
FIG. 11 is a view showing a state wherein the bin tray unit is moved downward to the home position, and the uppermost bin tray is set at a standby position facing a pair of discharge rollers.

In the standby state of the bin tray unit 501 in either a signal receive mode or a copy mode (to be described later), as shown in FIGS. 2 and 11, the uppermost first bin $71_1$ is moved downward to a position corresponding to the discharge rollers 67, and the bin tray unit 501 stands by at this lower position as a home position. When the above-mentioned lead cams 77 are intermittently rotated by one revolution in the forward direction, the bins are moved upward by one step per revolution of the cams.

FIG. 12 shows a state wherein the bin tray unit 501 is moved upward from the home position shown in FIGS. 2 and 11 by one bin step, and the second bin $71_2$ is located at the position corresponding to the discharge rollers 67.

FIG. 13 shows a state wherein the sixth bin $71_6$ is located at the position corresponding to the discharge rollers 67.

Also, FIG. 14 shows a state wherein the 10th bin $71_{10}$ is located at the position corresponding to the discharge rollers 67.

The level position shown in FIG. 14 where the lowermost 10th bin $71_{10}$ is located at the position corresponding to the discharge rollers 67 is the upper limit position of the upward movement. When the lead cams 77 are intermittently rotated by one revolution from this state in the reverse direction, the bins are moved downward by one step per revolution of the cams, and finally, the bin tray unit 501 is returned to the home position shown in FIGS. 2 and 11.

E. Inter-device Control System

Figure 15:
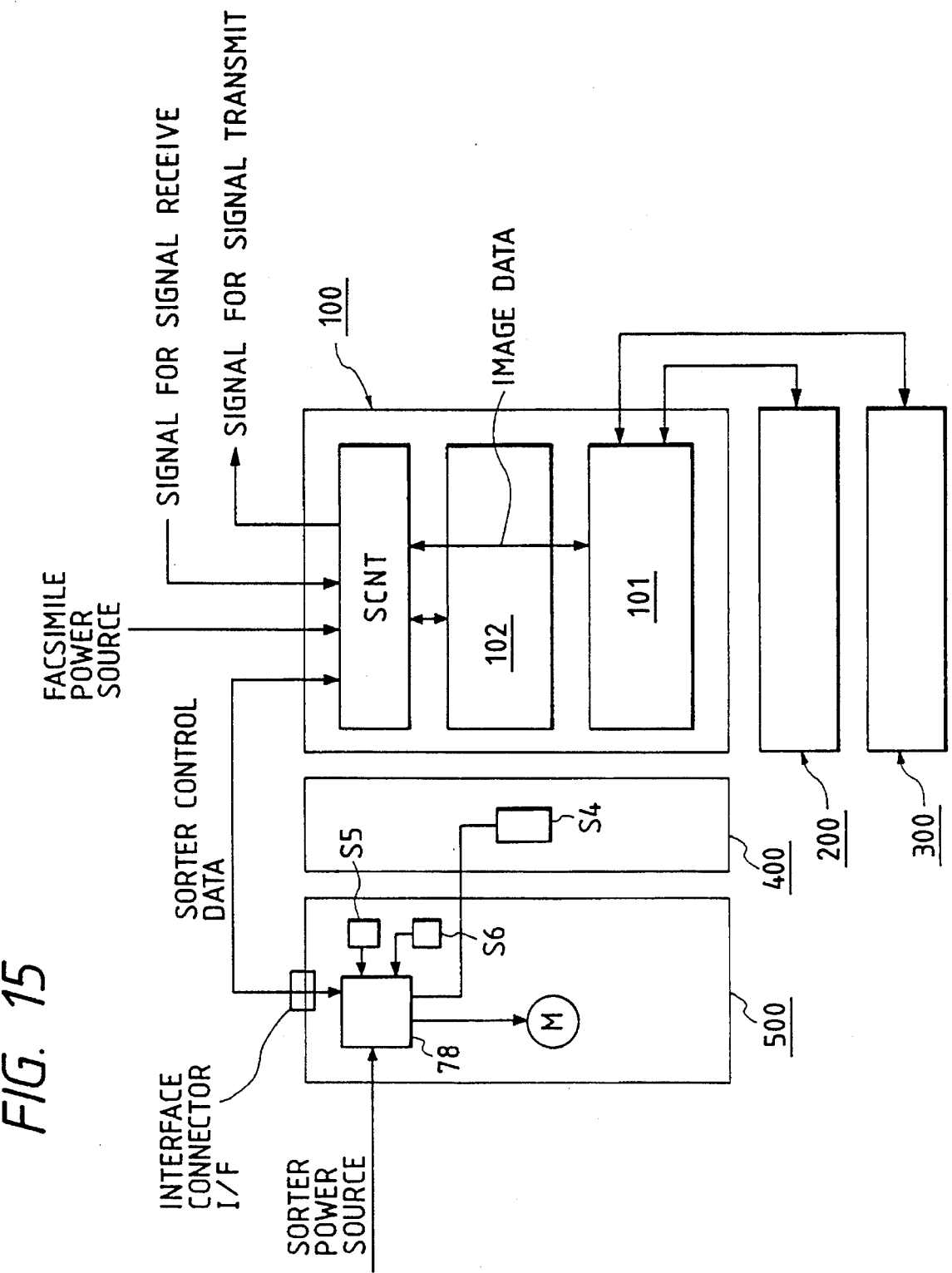
FIG. 15 is a block diagram of a control system for devices.

FIG. 15 is a block diagram showing a control system for the facsimile main body 100, the first and second sheet feed unit devices 200 and 300, and the sorter 500.

In this embodiment, a controller SCNT of the facsimile main body 100 relays between the printer unit 101 of the facsimile main body 100, and the sorter 500. More specifically, the facsimile controller controls the printer unit 101 and the sorter 500 in association with each other.

As will be described later, since sheets (recording sheets) output from the facsimile main body 100 are controlled in units of addresses or transmit sources, it is difficult to control the sorter 500 via the printer unit. When the printer unit 101 and the sorter 500 are controlled by the controller SCNT of the facsimile main body 1000 like in this embodiment, the above-mentioned control is facilitated. The printer unit 101 of the facsimile main body 100 and the sorter 500 can be mechanically connected to each other via the adapter 400 independently of the type of apparatus.

The controller SCNT of the facsimile main body 100 is electrically connected to a controller 78 in the sorter 500 via an interface connector I/F. The connector I/F has a short pin at the sorter side to perform connection detection. The controller SCNT of the facsimile main body 100 receives a signal for signal receive and outputs a signal for signal transmit. The controller SCNT controls the original reader unit 102 and the printer unit 101. The printer unit 101 controls the first and second sheet feed unit devices 200 and 300.

A controller 78 of the sorter 500 controls the forward/reverse rotation motor M of the bin tray unit vertical drive mechanism. Also, the controller 78 transmits a signal from the sheet sensor S4 in the adapter 400 and signals from the sheet sensor S5 and the through sensor S6 in the sorter 500 to the controller SCNT of the facsimile main body 100.

F. Normal Signal Receive (Sort Signal Receive per One Communication)

Figure 16:
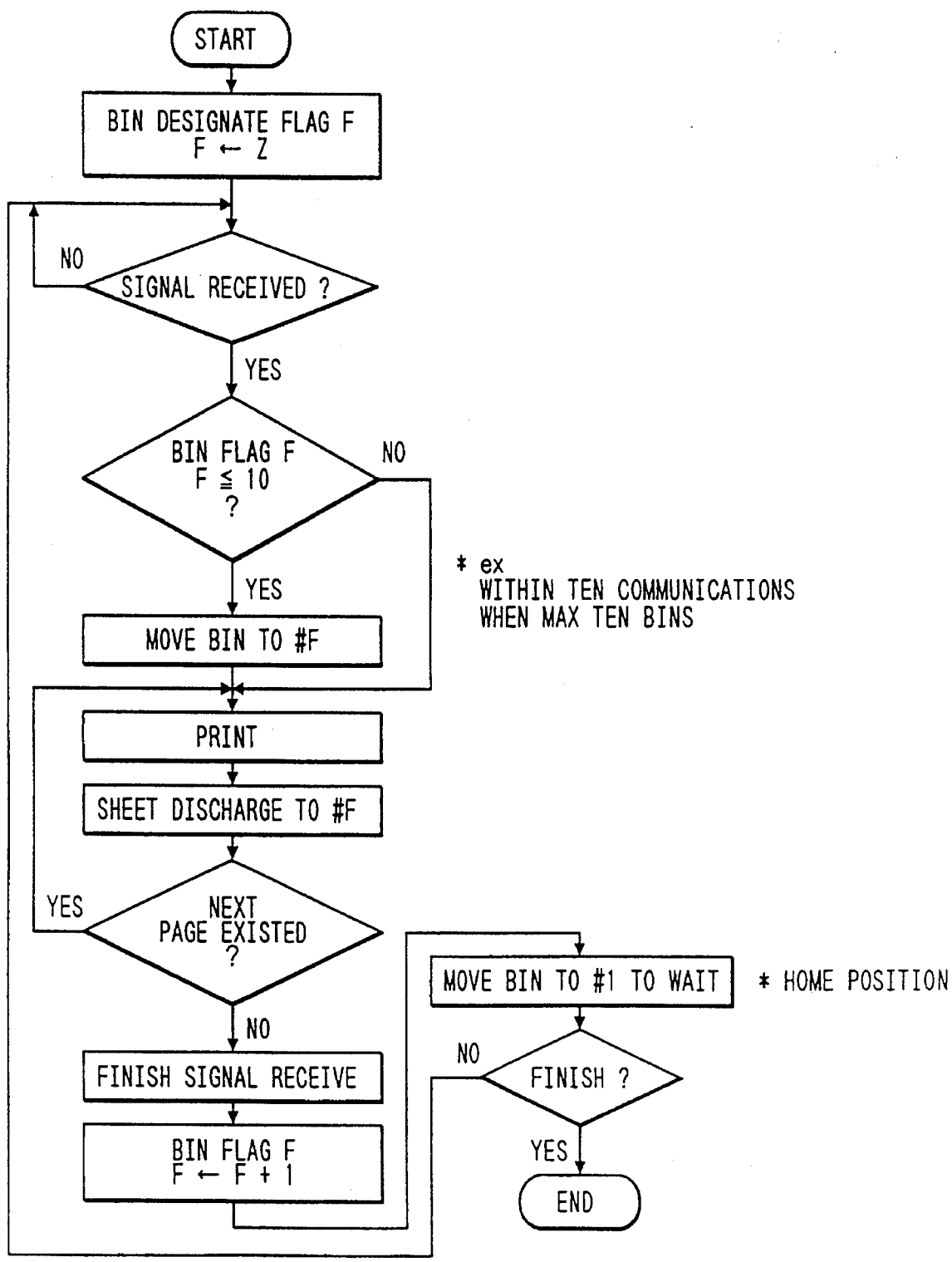
FIG. 16 is an operation flow chart of a normal signal receive mode.

FIG. 16 is an operation flow chart of the normal signal receive mode. In FIG. 16, F corresponds to bin designate flag (1~10) and # corresponds to the bin No. The home position is #1 and the normal signal receive starts from #2.

As described above, transmit information from a transmit source facsimile apparatus is received while being stored in a memory of the control system of the facsimile main body 100. When the transmit information is stored in the memory, the number of received sheets is detected. The received information stored in the memory is read out, and sheets as signal receive recording sheets are output by the print operation of the printer unit 101 of the facsimile main body 100.

As described above, in the sorter 500 of this embodiment, the uppermost first bin $71_1$ (uppermost bin) of the bin tray unit 502 has a capacity capable of containing 100 sheets, and the second to 10th bins $71_2$ to $71_{10}$ (intermediate bins) below the uppermost bin have a capacity capable of containing 20 sheets. These capacities correspond to LGL/LTR/A4-size sheets in a group 20-sheet mode; to LTR/A4-size sheets in a sort 30-sheet mode; and to LGL-size sheets in a sort 25-sheet mode.

In a power-ON (reset) state, the uppermost bin $71_1$ of the bin tray unit 502 is moved to and stands by at the home position (the lowermost position in FIGS. 2 and 11) corresponding to the position of the discharge rollers 67.

In the normal signal receive mode, the bin tray unit 502 is moved upward by one step of the bin for each communication, and sheets for each communication output from the facsimile main body 100 are sequentially sorted and contained in the corresponding bins. In this embodiment, the uppermost first bin $71_1$ is not used for sheet sorting for each communication, and the second to 10th bins $71_2$ to $71_{10}$ are used.

The bin movement start timing is simultaneous with the output timing of a print start signal, and in the normal signal receive mode, no bin movement is performed during one communication. After the signal receive operation is finished, the uppermost first bin $71_1$ is returned to the home position (FIGS. 2 and 11) corresponding to the position of the discharge rollers 67.

In this manner, sheets for each communication are sorted and contained in turn in each of the second to 10th bins $71_2$ to $71_{10}$. When sheets are contained in all the second to 10th bins $71_2$ to $71_{10}$, all sheets in the following communications are discharged and contained in the first bin $71_1$. Also, a mode for forcibly discharging sheets only on the uppermost first bin $71_1$ can be selected.

As described above, the uppermost bin $71_1$ stands by at the start position, and the sort operation is executed by discharging sheets onto the second to 10th bins $71_2$ to $71_{10}$. After the sheets are discharged onto all the second to 10th bins $71_2$ to $71_{10}$, the following sheets are discharged onto the uppermost bin $71_1$. More specifically, since the apparatus comprises control means for maintaining the uppermost bin $71_1$ in a state wherein it faces the sheet supply port 67, and for, when sheets are sorted, moving the bins upward in turn after the second bin $71_2$ below the uppermost bin $71_1$ is located at a position facing the sheet supply port 67, and control means for moving the bins downward to a position where the uppermost bin $71_1$ faces the sheet supply port 67 after the sheet sort operation is finished, and then setting a standby state, the uppermost bin which has a high use frequency and a larger sheet contain number than other bins stands by at the home position, and sheets are discharged onto this bin last, thus allowing easy sorter control.

G. Bin Designate Signal Receive (Mail Box)

Figure 17B:
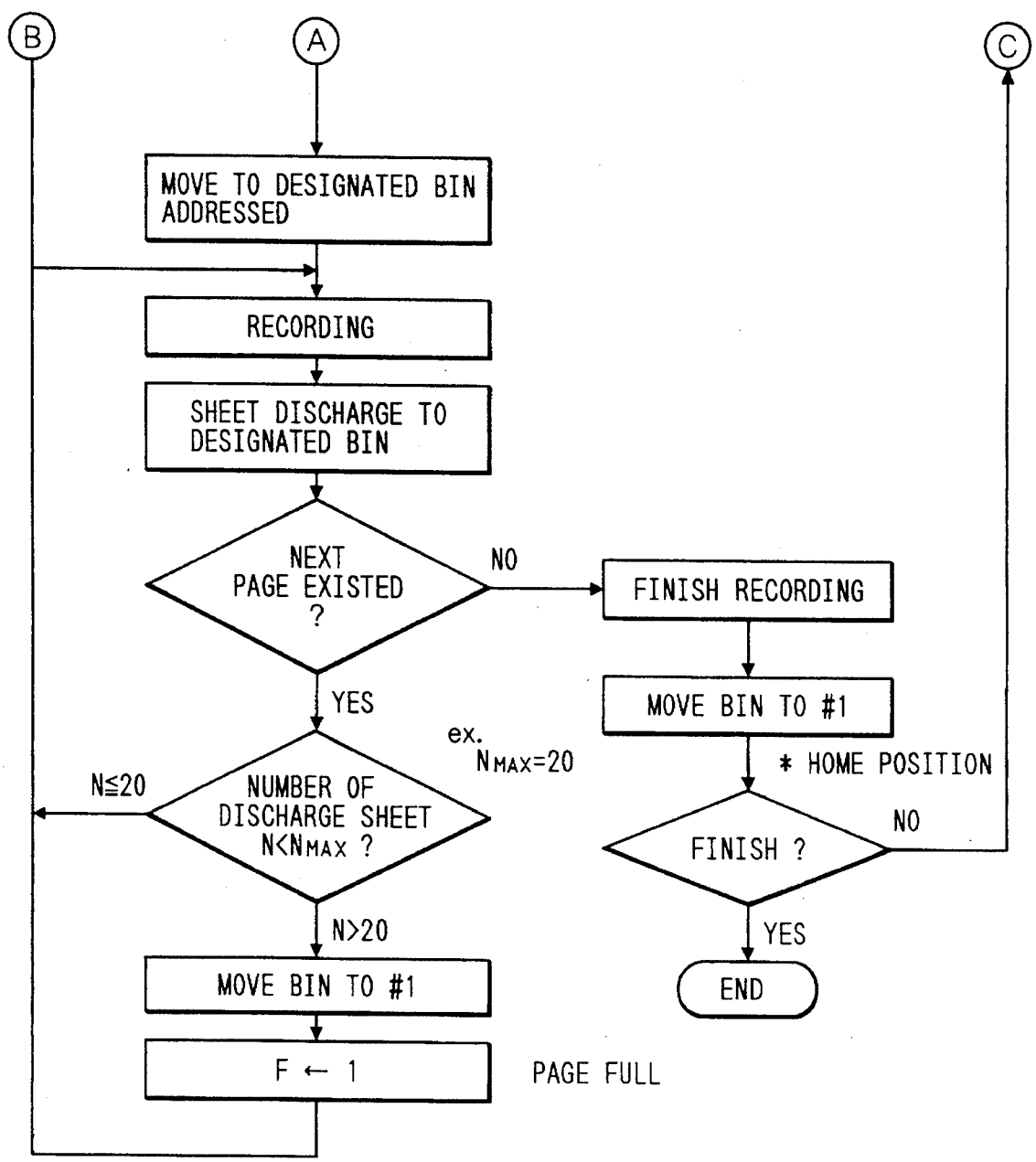
FIG. 17 is comprised of FIGS. 17A and 17B showing operation flow charts of a bin designate signal receive mode.

FIGS. 17A and 17B are operation flow charts of the bin designate signal receive mode. In FIG. 17, F corresponds to page full flag, N to the number of discharge sheet, and $N_{max}$ to the maximum allowable continuing number of sheets.

In this signal receive mode, sheets printed in a communication with a designed address are discharged onto a designated one of the second to 10th bins $71_2$ to $71_{10}$ excluding the first bin $71_1$. More specifically, the bin tray unit 502 is moved upward so that the designated bin tray is located at a position corresponding to the position of the discharge rollers 67 as the sheet supply port, and sheets are discharged onto this bin.

When the number of sheets to be discharged is equal to or smaller than 20, sheets are discharged onto the designated bin tray; when the number of sheets to be discharged exceeds 20, sheets are discharged on the uppermost first bin tray $71_1$. More specifically, since each of the bins $71_2$ to $71_{10}$ to which sheets are normally discharged has the maximum allowable contain number of sheets as small as 20, sheets which record images more than the maximum allowable contain number of sheets of these bins cannot be discharged onto a single bin.

For this reason, the number of pages is counted while storing all the received images in the memory, and the following control is performed based on the count. That is, when the total number of pages is smaller than a predetermined value, sheets on which images are recorded are discharged onto the designated bin; when the total number of pages is equal to or larger than the predetermined value, sheets are discharged onto the uppermost first bin $71_1$ having the maximum allowable contain number of sheets larger than that of other bins.

In the bin designate signal receive mode, a user need only check the designated bin. For this reason, the user may not notice sheets discharged, as described above, onto another bin ($71_1$). Thus, when the total number of pages is equal to or larger than the predetermined value, the first page is recorded again on another sheet (different from that discharged on the uppermost bin $71_1$), and the sheet of the first page is discharged onto the designated bin, thus solving the above-mentioned problem.

When the number of received pages is equal to or larger than the predetermined value, a report which records a message indicating that received images are discharged onto another bin may be output onto the designated bin.

H. Plural Copies Designate Signal Receive (Sort Signal Receive)

Figure 18B:
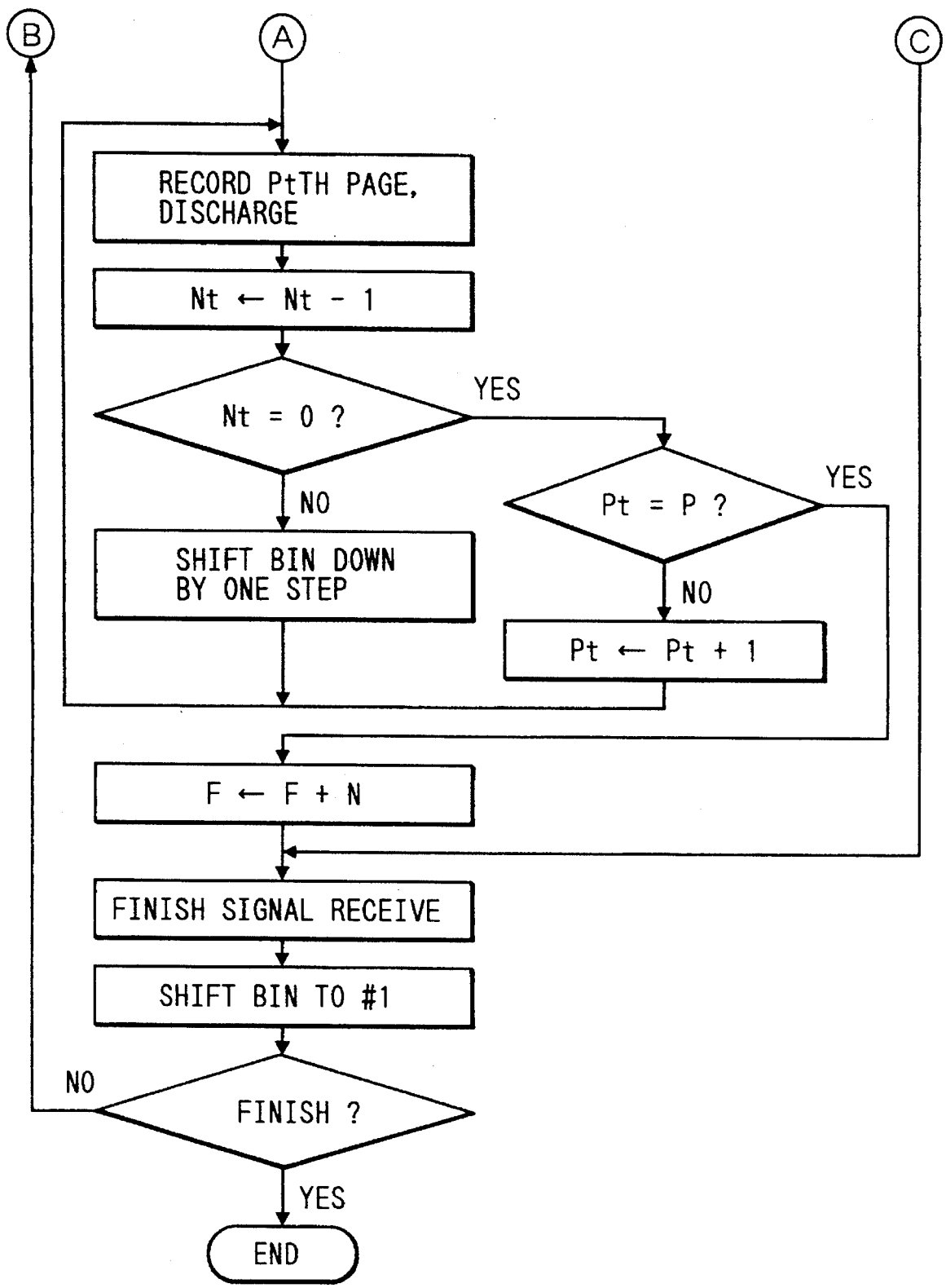
FIG. 18 is comprised of FIGS. 18A and 18B showing operation flow charts of a plural copies designate signal receive mode.

FIGS. 18A and 18B are operation flow charts of this plural copies designate signal receive (sort signal receive) mode. In this mode, sheets are sorted and discharged in correspondence with the designated number of receive copies. The number of copies can be designated by both the receiving side and the transmitting side. After sheets are discharged up to the 10th bin $71_{10}$, all the remaining sheets are discharged onto the first bin $71_1$. When sheets have already been stacked on the bins, the plural copy designation is released. In FIG. 18, F corresponds to the bin number and sheet discharge starts from No. 2.

For the sake of simplicity, the first to 10th bins $71_1$ to $71_{10}$ are respectively represented by #1 to #10.

(i) When N Copies are Designated

1st Communication: discharge sheets onto #2, #3, . . . , #N−1

2nd Communication:

When $$N-1+N=2N-\leq 10,$$

discharge sheets onto #N, #N+1, . . . , #2N−1

When $$N-1+N=2N-1>10,$$

discharge all sheets onto #1 Example) When N=4,

1st Communication: #2, #3, #4, #5
2nd Communication: #6, #7, #8, #9
3rd and Subsequent Communications: #1

(ii) When sheets have already been stacked on the bins, the following two methods are available:

(a) Release plural copy designation
(b) Discharge sheets from next bin

The method (a) is simple and reliable, but the method (b) for storing a pin designate flag can be described by the same means as in other operations.

(iii) Bin Movement Timing

Figure 19:
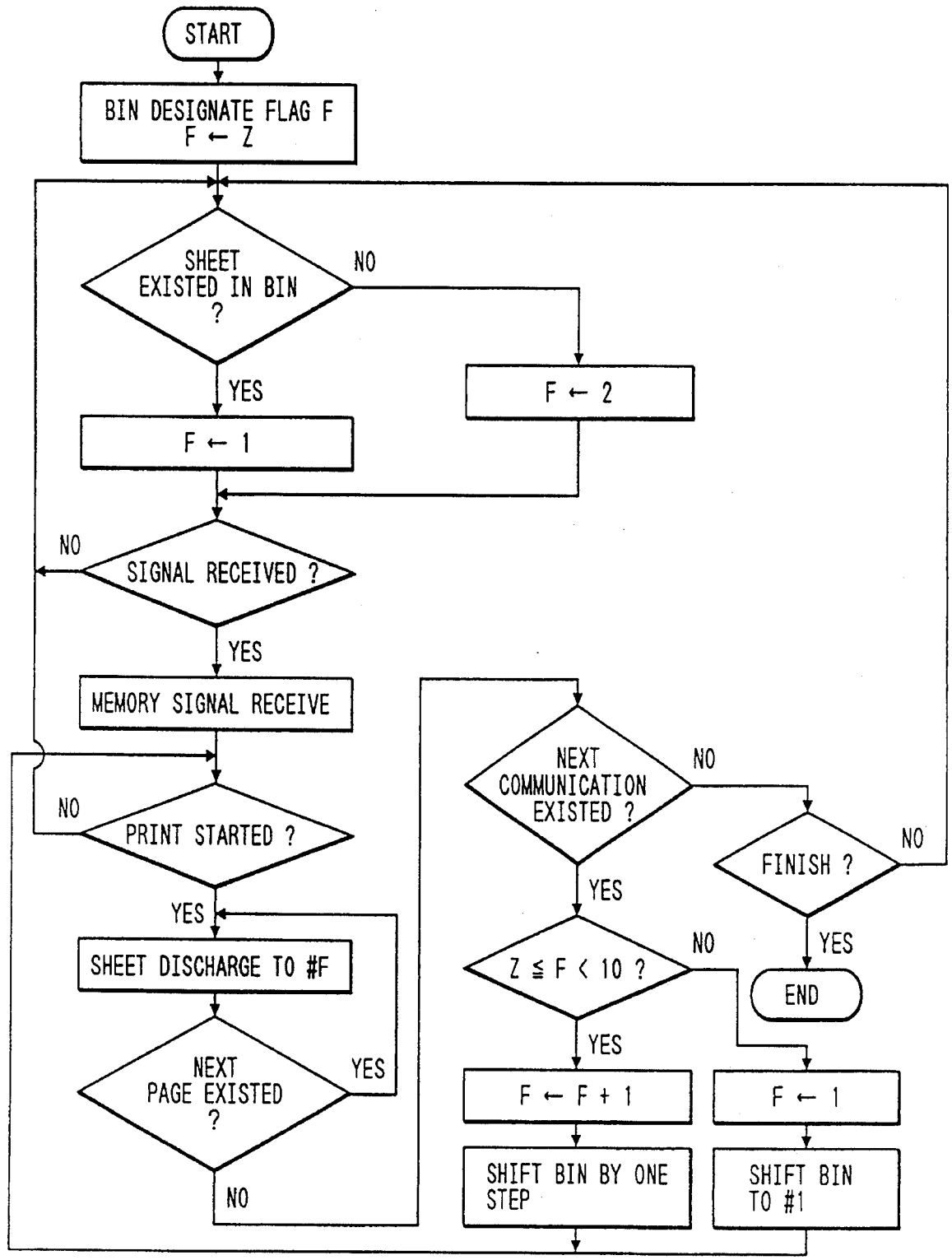
FIG. 19 is an operation flow chart of a sort in every communication discharge mode in a memory signal receive mode.

1. Receive a sort mode designate command Designate the sheet interval to be a value upon sorting Upon movement between adjacent bins:
Delay the interval by 0.6 sec Upon movement from #10 to #1:
Delay the interval by 5.4 sec 2. Receive the number of copies to be printed and the number of pages per copy
3. Receive a print start signal
4. Move to the designated bin
5. Detect the leading end of a sheet by the sheet sensor S5 after movement
6. Detect the trailing end of the sheet by the sheet sensor S4
7. Increase the rotational speed of the discharge rollers 67
8. Detect the trailing end of the sheet by the sheet sensor S5
9. Decrease the rotational speed of the discharge rollers 67
10. Move the bin tray
11. Repeat steps 5 to 10 by the number of copies to be printed
12. Return the bin tray to #1 after the print operation is finished I. Memory Signal Receive (i) Sort in Every Communication Discharge Mode FIG. 19 is an operation flow chart of this mode.
In this mode, sheets are discharged in the order of #2, #3, . . . , #10, #1 in units of communications.

(ii) Confidential Signal Receive

Figure 20:
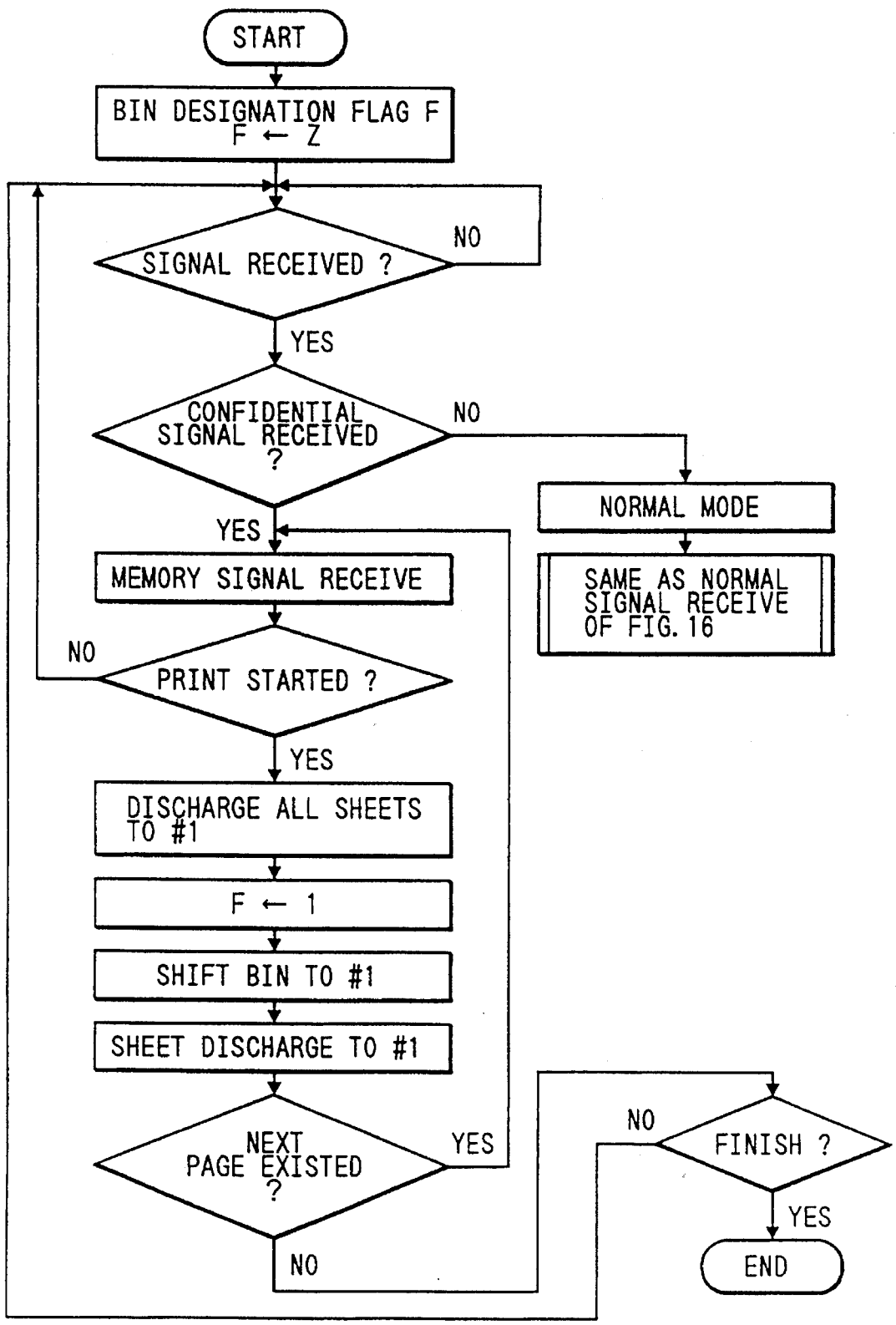
FIG. 20 is an operation flow chart of a confidential signal receive output mode in the memory signal receive mode.

FIG. 20 is an operation flow chart of this mode. In this mode, all sheets received in the confidential signal receive mode are output to #1. In this case, a mode for sorting sheets in units of communications is also available.

Since the recording operation of images received in the confidential signal receive mode is started by inputting an identification number, sheets are preferably discharged on the bin from which sheets can be easily removed rather than the designated bin. Thus, sheets on which images received in the normal signal receive mode are recorded are discharged onto the designated bin. On the other hand, the recording operation of images received in the confidential signal receive mode is started when an identification number is input, and sheets on which the images received in the confidential signal receive mode are recorded are discharged onto the uppermost first bin $71_1$ (#1) regardless of bin designation.

J. Sort in Every Communication Signal Receive (Multipoling)

Figure 21B:
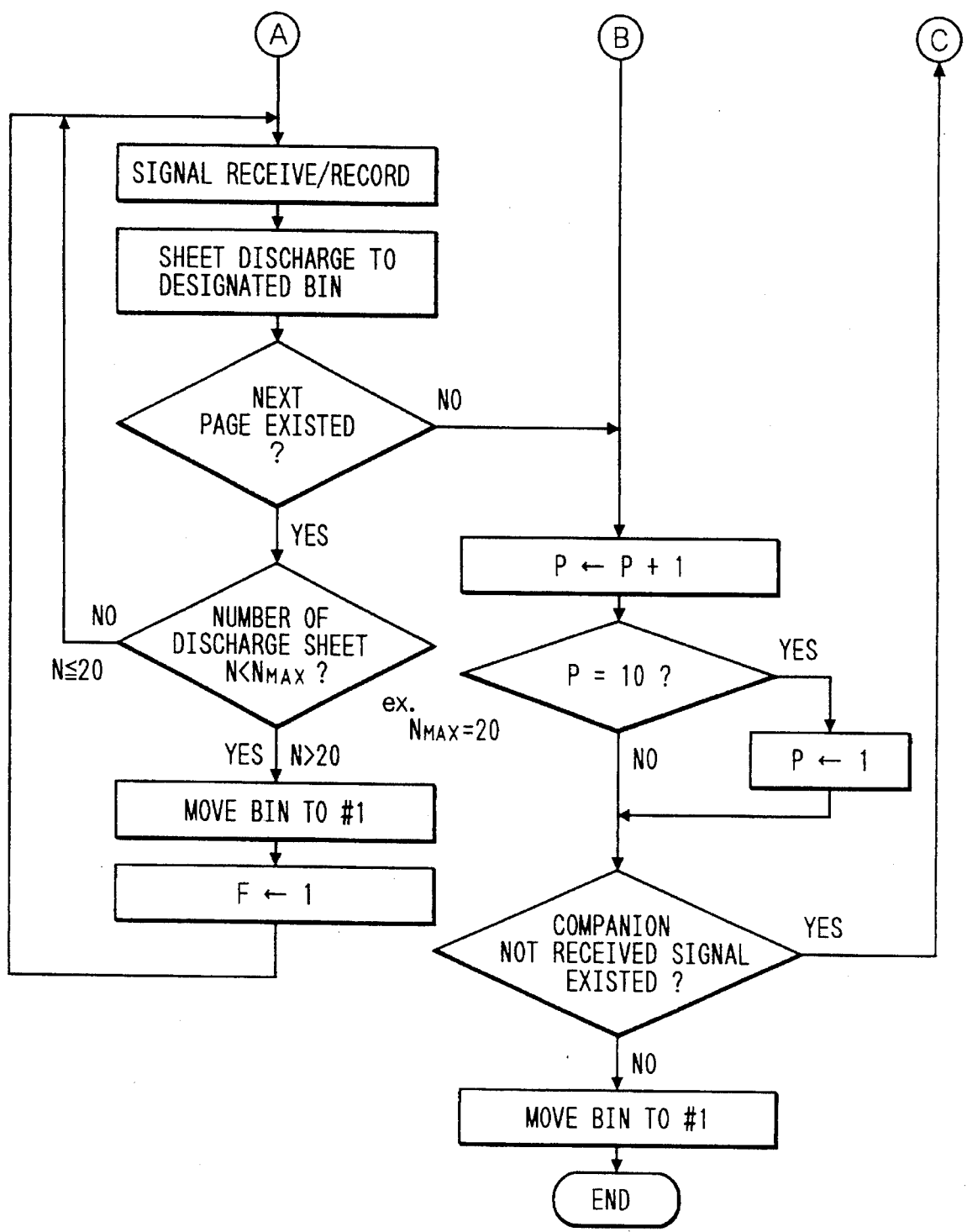
FIG. 21 is comprised of FIGS. 21A and 21B showing operation flow charts of a multipoling signal receive mode.

FIGS. 21A and 21B are operation flow charts of the multipoling signal receive mode. In the multipoling signal receive mode, sheets are output onto the designated bins in units of communications. In FIG. 21, flag F is set $\phi$ when not full and 1 when full. P=1–9 multipole by 9 times.

The facsimile main body 100 has a poling function, and the operation panel 51 or the controller comprises means for designating bins corresponding to poling companions, means for selecting a bin corresponding to a called selection signal, and means for discharging sheets which record images received in the poling signal receive mode onto the selected bin. More specifically, a plurality of companion numbers which are set in advance are sequentially called, and when the poling mode is set and images are received from each companion, sheets which record the received images are output onto the bin tray corresponding to the companion.

This can cope with a case wherein a given companion is in a busy state, and the poling signal receive operations cannot be performed in the set order.

K. Copy (i) Normal Copy When originals O are set on the original table 31 of the facsimile main body 100 and a copy key (FIG. 5) on the operation panel 51 is pressed down, the originals O are pulled into the original reader unit 102 one by one, and image information is photoelectrically read by the photoelectric image reading element array 36. The read originals are discharged onto the tray 39. Copies are then output by the print operation of the printer unit 101. The copies are discharged onto the uppermost first bin $71_1$ (#1) of the sorter 500.

(ii) Sort Copy

1. When a multi-copy mode is designated while the sorter 500 is connected, if N≦10, the sort copy mode is automatically selected. On the other hand, if N>10, only 10 copies of originals are formed, and a message "remove sheets" is displayed (liquid crystal display 52). Then, the apparatus returns to the standby mode (N←N–10). When remaining copies after 10 copies are to be formed, the start button is pressed down again (memory multi-copy mode). If the number of originals is only 1, sheets are discharged onto #1 regardless of the designated number of copies.

2. The sort copy mode is executed on the premise that no sheets exist on any bins since a plurality of copies are to be formed.

3. If sheets exist on bins when the sort copy mode is designated, a message "remove sheets" is displayed, and the apparatus is returned to the standby mode.

4. When sheets are removed and the sort copy mode is designated again, the message "remove sheets" is cleared, and the sort copy mode is started.

5. If originals are removed in the standby state of "3", the message "remove sheets" is cleared.

L. Emergency Operation (i) Signal Receive During Sort Copy Operation

Images corresponding to the remaining image memory capacity after the memory capacity used for sorting is excluded are received.

(ii) Countermeasure Against Sheet-out State During Sort Recording Operation

After sheets (recording sheets) are set, the remaining images are output by pressing down the start button.

(iii) Operation After Jam Processing During Sort Recording Operation

When "output remaining images" is selected on the operation panel after the jam processing, the output operation is restarted from an image corresponding to a jammed sheet; when "select output image" is selected, the output operation is restarted from the designated bin and page; and when "output again" is selected, images are output from the first page.

M. Emergency Print-out

In the case of the facsimile apparatus, information must always be received even if the sorter 500 goes wrong. For this reason, if recorded images are not output, the memory overflows.

In the apparatus of this embodiment, when the sorter 500 goes wrong (out of order), a user can mechanically detach the sorter 500 from the facsimile main body 100, and data can be output upon operation by the user.

More specifically, the apparatus comprises means for mechanically separating the sorter 500 from the facsimile main body 100 by a user when the sorter goes wrong, and the emergency print-out state is discriminated based on the states of the sorter power source, the connection sensor of the sorter, the I/F connector, and the connection sensor of the main body, thereby inhibiting/permitting recording.

At this time, since an operation must be inhibited or performed depending on the attachment/detachment state of the sorter, means for detecting the attachment/detachment state is required.

| Sorter Power Source | Connection Sensor of Sorter | I/F Connector | Connection Sensor of Main Body | Connection State | Output |
| --- | --- | --- | --- | --- | --- |
| ON | ON | ON | ON | Normal Connection | Normal Output |
| OFF | ON | ON | ON | Sorter Abnormality | Output Inhibit |
| ON/OFF | OFF | ON | ON | Sorter Abnormality | Output Inhibit |
| ON/OFF | ON/OFF | OFF | OFF | Connection Error | Output Inhibit |
| ON/OFF | ON/OFF | OFF | OFF | Coupling Error | Output Inhibit |
| ON | OFF | ON | OFF | Release Coupling | Forced Output |

(i) State Wherein Operation Must be Performed
 1. Non-option (standard) state
 2. Normally set state Mechanical connection I/F cable connection power source ON
 3. Emergency print-out data can be output by a user's operation when the sorter is out of order.
(ii) State Wherein Operation Must be Inhibited
 1. During jam processing
 2. Although the sorter is mechanically connected, the I/F cable is disconnected or the power source of the sorter is OFF.

N. Sort 30-sheet Mode, Group 20-sheet Mode

As described above, the contain number of sheets of each of the second to 10th bins $71_2$ to $71_{10}$ of the sorter 500 of this embodiment is set to be 20. When sheets more than the predetermined number of sheets are to be discharged, bin movement is temporarily performed to cause the discharged sheets to settle, and thereafter, the remaining sheets are discharged. Thus, sheets more than the predetermined number of sheets can be discharged and contained in a bin. Therefore, the contain number of sheets in the bin can be increased, and the capacity of the bin can be maximally utilized. More specifically, the apparatus comprises control means for selecting a sort mode for moving the bins upward or downward by operating the bin vertical moving means every time a sheet enters a single bin, and a group mode for continuously discharging sheets onto a single bin, and the maximum allowable number of sheets on a single bin in the sort mode is set to be larger than that in the group mode.

The apparatus also comprises means for, when the number of pages of images to be recorded is larger than the maximum allowable number of sheets in the group mode, moving a bin to the neighboring bin position before recording sheets are discharged up to the maximum allowable number of sheets in the group mode, thereafter, discharging the remaining sheets after the bin is returned to the original position. Since the bins are vertically moved, sheets in the bin are shaken to settle, and the contain number of discharged sheets can be increased.

O. Countermeasure Against Curl of Sheet

A sheet on which an image with a high black ratio is printed tends to curl, and when a sheet which is curled beyond an allowable amount (e.g., 15 mm) enters the narrow bin, the following sheet may jam, or the next sheet may be discharged under the curled sheet. Thus, sheets of received images which are stored in the memory and include a page having a black ratio equal to or higher than a predetermined value are controlled to be discharged onto the uppermost first bin $71_1$ (#1).

P. Countermeasure Against Unexpected Insertion/removal of Sheets Discharged onto Bins As described above, the sheet sensor S6 (through sensor) shown in FIGS. 2 and 10 is a sensor (intra-bin sheet presence/absence detection sensor) for detecting if sheets exist on any of the plurality of bins $71_2$ to $81_{10}$ (#2 to #10). When all sheets stacked on the bins $71_2$ to $71_{10}$ are removed in the standby state, since the optical path of the sensor S6 is released, a bin designate flag is cleared. If the sensor S6 is turned on before the sheet discharge operation, the bin designate flag is set to be #10, and thereafter, all sheets are discharged onto #1.

A user often picks up a sheet from a bin to check if the sheet is addressed to himself or herself, and when the sheet is not addressed to him or her, the user often returns the picked-up sheet to the bin. In this case, the sensor $6 is temporarily turned on, and is then turned off. Different countermeasures must be taken against the above-mentioned case and a case wherein sheets are inserted in any of bins. More specifically, in the former case, the operation should be continued. However, in the latter case, since the bin in which the sheet is inserted is unknown, the following sheets must be discharged onto the bin #1.

In order to solve this problem, the apparatus comprises means for, when the sensor S6 detects that a sheet "presence" state changes to a sheet "absence" state, and detects the sheet "absence" state for a predetermined period of time, determining the "absence" of sheets in the bins. With this means, erroneous control of the apparatus caused by the ON/OFF operations of the sensor S6 due to unexpected insertion/removal of sheets from the bins can be prevented.

Q. Bin to Which Communication Management Report is to be Discharged

A communication management report (a communication end report, error message, memory transmit end report, or the like) tends to remain in a bin even if other sheets are removed from bins and are taken away. For this reason, when such a communication management report is discharged onto one of the bins $71_2$ to $71_{10}$ which are subjected to presence/absence detection of sheets by the sensor S6, the sensor S6 keeps detecting the sheet "presence" state due to the presence of the communication management report remaining after all other sheets are removed, and the sorter cannot be efficiently controlled.

Thus, the communication management report, and the like other than sheets of received or copied images are discharged on a bin which is not subjected to sheet detection by the sensor S6, i.e., the uppermost first bin $71_1$ in this embodiment. Thus, the above-mentioned problem can be solved.

R. Sheet Discharge Speed

In the printer unit 101 of the facsimile main body 100 of this embodiment, the film heating type fixing device 9 (FIG. 4) with high quick startability is used as image fixing means. For example, when heat roller pair type fixing means is used, it has a large sheet nip force (grip force). For this reason, even when the speed difference from the discharge rollers is relatively large, it does not so seriously influence the image. However, since the film heating type fixing device 9 has a relatively small nip force of a sheet, the sheet discharge speed considerably influences the image. For this reason, the convey speed of the sorter must be caused to coincide with the process speed.

In this embodiment, even a fixing device with a small sheet nip force can be prevented from influencing the sheet convey force at the downstream side.

(i) The convey speed in the main body is set in correspondence with the process speed of the fixing device 9 (about 24 mm/s in this embodiment), and a sheet is accelerated after it is discharged from the main body.

(ii) The sheet grip force of the discharge rollers in the connection adapter is set to be large, so that a single convey speed can correspond to a plurality of process speeds.

(iii) The sheet discharge timing from the printer unit is accurately detected to increase the convey speed.

1. calculate the time from TOP based on the sheet size and process speed
2. set a new status signal indicating passage of the sheet discharge sensor
3. add a BPS (photointerrupter)

In this embodiment, the apparatus comprises discharge rotary members 11 for discharging a sheet subjected to fixing processing by the fixing means 9 onto the discharge tray, and control means for controlling the rotational speed of the rotary members 11 to be equal to the process speed of the fixing means 9 when a sheet is clamped in the fixing means 9, and to be high when the sheet leaves the fixing means 9. Also, the apparatus comprises convey rotary members 10 which are arranged between the fixing means 9 and the discharge rotary members 11 and are rotated at the same speed as that of the fixing means 9, and drive means for rotating the discharge rotary members at a speed higher than that of the convey rotary members, and slip-supporting the discharge rotary members.

S. Stapler

The sorter 500 can comprise a stapler for stapling a set of a plurality of sheets discharged onto the bin.

(i) The sheet position to be stapled is determined on the basis of a received image, and sheets are output to the bin.

(ii) Sheet are reversely output from the last line side of received images, and are stapled.

In this embodiment, since a face-up recording system is used, the stapler is arranged at the rear side of the apparatus.

As the apparatus arrangement, an image recording apparatus having a stapler comprises a memory for temporarily storing a received image, means for determining upper and lower sides of the received image, and means for setting the direction of a sheet (recording sheet) and the direction of an image output so that an upper left corner of the received image is stapled.

An image recording apparatus having a stapler comprises a memory for temporarily storing a received image, and recording means for outputting the received image from last pixel information thereof.

What is claimed is:

1. An information transmit/receive apparatus comprising:

a printer having a sheet feed portion, a sheet discharge portion and a first sheet sensor disposed adjacent to the discharge portion;

an original reader having a sheet feed portion and a sheet discharge portion;

a sorter having a sheet entrance port, second sheet sensor and a controller for controlling movement of the sorter, and connected to the sheet discharge portion of said printer via an adapter for coupling the sheet discharge portion and the sheet entrance port together;

said adapter having a path connecting the sheet discharge portion of said printer and the sheet entrance port of said sorter; and control means for controlling said sorter and original reader to perform a receive operation and a transmit operation, wherein said adapter includes a sheet passage detection sensor for informing said controller that the sheet is in the path of said adapter.

2. An apparatus according to claim 1, wherein said original reader is arranged above said printer, and said sheet discharge portions of said original reader and said printer are directed in the same direction.

3. An information transmit/receive apparatus according to claim 1, wherein said sorter includes a bin tray and discharge roller for discharging the sheet to the bin tray, and said controller accelerates a rotation speed of the discharge roller when a trail end of the sheet is detected by said detection sensor, and reduces the rotation speed of the discharge roller when the sheet trail end is detected by the second sheet sensor.

4. An apparatus according to claim 1, wherein said adapter has a cover having a transparent portion which allows visual observation of a recording sheet passage state in said adapter.

5. An apparatus according to claim 1, wherein said sorter further comprises:

a plurality of bin trays for receiving a sheet to be discharged;

bin tray vertical moving means for moving said bin trays upward so that an interval between the bin tray located at a position of a sheet reception portion and the bin tray immediately thereabove is wider than an interval between other bin trays; and control means for selecting a sort mode for moving said bin trays upward or downward by operating said bin tray vertical moving means every time a sheet enters one bin tray, and a group mode for continuously discharging sheets onto one bin tray, wherein a maximum allowable number of sheets entering each bin tray in the sort mode is larger than a maximum allowable number of sheets entering the one bin tray in the group mode.

6. An apparatus according to claim 5, wherein when the group mode is selected and the number of pages of images to be recorded is larger than the maximum allowable number of sheets entering the one bin tray in the group mode, the one bin tray is moved to a neighboring bin tray position before receiving the maximum allowable number of sheets, and thereafter, the remaining recording sheets are received after the bin tray is returned to an original position.

7. An apparatus according to claim 1, wherein said sorter further comprises:

a plurality of bin trays;

a supply port for supplying a sheet into said bin trays;

bin moving means for moving said bin trays upward or downward; and control means for maintaining a standby state wherein the uppermost bin tray of said bin trays faces said supply port, and for, when sheets are sorted, moving said bin trays upward in turn after the second bin tray from the top of said bin trays is set to face said supply port.

8. An apparatus according to claim 7, wherein the contain number of sheets of the uppermost bin tray is largest.

9. An apparatus according to claim 8, further comprising control means for moving said bin trays downward to a position where the uppermost bin tray faces the supply port after the sheets are sorted, and thereafter, setting the standby state.

* * * * *

UNITED STATES PATENT AND TRADEMARK OFFICE
CERTIFICATE OF CORRECTION

PATENT NO. : 5,535,012
DATED : July 9, 1996
INVENTOR(S) : HIROAKI MATSUMOTO, ET AL.

It is certified that error appears in the above-indentified patent and that said Letters Patent is hereby corrected as shown below:

On title page, item [56]
"3162364 7/1991 Japan" should read --3-162364 7/1991 Japan--.

<u>Column 2,</u>
  line 31, "contain" should read --contained--.

<u>Column 8,</u>
  line 43, "200→sheet" should read --200→the sheet--;
  line 44, "100→turn" should read --100→the sheet--; and
  line 56, "$4" should read --$4--.

<u>Column 9,</u>
  line 23, "$5" should read --$5--.

<u>Column 12,</u>
  line 26, "1000" should read --100--.

<u>Column 14,</u>
  line 49, "N-1+N = 2N-$\leq$10," should read --N-1+N = 2N-1$\leq$10,--.

<u>Column 15,</u>
  line 52, "P=1-9" should read --P=1∼9--.

<u>Column 21,</u>
  line 6, "contain" should read --contained--.

Signed and Sealed this

Third Day of December, 1996

Attest:

BRUCE LEHMAN

*Attesting Officer*  *Commissioner of Patents and Trademarks*